(12) United States Patent
Sandford et al.

(10) Patent No.: US 12,114,651 B2
(45) Date of Patent: Oct. 15, 2024

(54) INSECT TRAP DEVICE AND METHOD OF USING

(71) Applicant: The Procter & Gamble Company, Cincinnati, OH (US)

(72) Inventors: Andrew Sandford, Marlborough, MA (US); Daniel Lazarchik, South Boston, MA (US); Lars Lieberwirth, Shanghai (CN); Hans Peter Schaefer, Newry, ME (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 18/501,636

(22) Filed: Nov. 3, 2023

(65) Prior Publication Data

US 2024/0057579 A1    Feb. 22, 2024

Related U.S. Application Data

(63) Continuation of application No. 16/716,534, filed on Dec. 17, 2019, which is a continuation of application
(Continued)

(51) Int. Cl.
*A01M 1/04* (2006.01)
*A01M 1/14* (2006.01)
(Continued)

(52) U.S. Cl.
CPC .............. *A01M 1/145* (2013.01); *A01M 1/04* (2013.01); *A01M 1/14* (2013.01); *A01M 1/02* (2013.01); *A01M 1/023* (2013.01); *A01M 1/106* (2013.01)

(58) Field of Classification Search
CPC ........... A01M 1/04; A01M 1/14; A01M 1/145
(Continued)

(56) References Cited

U.S. PATENT DOCUMENTS

| 2,307,163 A | 1/1943 | Evan |
| 2,942,090 A | 6/1960 | Diehl |

(Continued)

FOREIGN PATENT DOCUMENTS

| AT | 169968 B | * 12/1951 |
| AT | 513518 B1 | 5/2014 |

(Continued)

OTHER PUBLICATIONS

EPO Search Report and Opinion for 14757204.4 dated Nov. 8, 2016; 9 pages.
(Continued)

*Primary Examiner* — Darren W Ark
(74) *Attorney, Agent, or Firm* — Amanda Herman Berghauer

(57) ABSTRACT

An insect trap device and methods of using the device are described herein. In some embodiments, an insect trap includes a light source, a removable enclosure with at least one opening, an adhesive surface at least partially within the enclosure, and optics to redirect light from the light source onto an adhesive trapping surface. The light source may include at least one light emitting diode (LED). The optics may be attached to the removable enclosure, and may be located at least partially within the enclosure. The optics may include optical enhancers such as a reflector, a lens and/or a diffuser. The insect trap may further include an insect attractant that emits sound or scent.

17 Claims, 17 Drawing Sheets

Related U.S. Application Data

No. 15/960,648, filed on Apr. 24, 2018, now Pat. No. 11,445,716, which is a continuation of application No. 14/771,611, filed as application No. PCT/US2014/019175 on Feb. 28, 2014, now abandoned.

(60) Provisional application No. 61/787,629, filed on Mar. 15, 2013, provisional application No. 61/771,774, filed on Mar. 1, 2013.

(51) Int. Cl.
  *A01M 1/02* (2006.01)
  *A01M 1/10* (2006.01)

(58) Field of Classification Search
  USPC .................................................. 43/113, 114
  See application file for complete search history.

(56) References Cited

U.S. PATENT DOCUMENTS

| | | | | |
|---|---|---|---|---|
| 3,023,539 | A * | 3/1962 | Emerson, Jr. | A01M 1/145 43/113 |
| 3,346,988 | A * | 10/1967 | Ernest | A01M 1/223 43/112 |
| 3,348,332 | A | 10/1967 | Oconnell et al. | |
| 3,513,585 | A * | 5/1970 | Ross | A01M 1/04 362/101 |
| 3,729,857 | A | 5/1973 | Giordano | |
| 3,729,858 | A | 5/1973 | Bradshaw | |
| 3,768,196 | A | 10/1973 | Iannini | |
| 3,796,001 | A * | 3/1974 | Jackson | A01M 1/08 43/139 |
| 3,823,506 | A | 7/1974 | Iannini | |
| 3,835,577 | A | 9/1974 | Soulos | |
| 3,894,351 | A * | 7/1975 | Lannini | A01M 1/223 43/112 |
| 3,986,292 | A | 10/1976 | Klebanoff | |
| 3,998,000 | A * | 12/1976 | Gilbert | A01M 1/223 43/112 |
| 4,086,720 | A * | 5/1978 | Wiser | A01M 1/2016 362/802 |
| 4,117,624 | A | 10/1978 | Phillips | |
| 4,121,371 | A * | 10/1978 | Kaphengst | A01M 1/223 43/112 |
| 4,127,961 | A * | 12/1978 | Phillips | A01M 1/145 43/139 |
| 4,141,173 | A | 2/1979 | Weimert et al. | |
| 4,182,069 | A * | 1/1980 | De Yoreo | A01M 1/04 43/112 |
| 4,212,129 | A * | 7/1980 | Shumate | A01M 1/04 43/113 |
| D282,390 | S | 1/1986 | Young | |
| 4,654,998 | A * | 4/1987 | Clay | A01M 1/145 43/115 |
| 4,686,789 | A | 8/1987 | Williams | |
| 4,700,506 | A | 10/1987 | Williams | |
| 4,709,502 | A | 12/1987 | Bierman | |
| 4,709,503 | A | 12/1987 | Mcqueen | |
| 4,714,984 | A | 12/1987 | Spector | |
| 4,735,358 | A | 4/1988 | Morita et al. | |
| 4,815,231 | A | 3/1989 | Mcqueen | |
| 4,852,296 | A * | 8/1989 | Swanson | A01M 1/04 43/112 |
| 4,873,786 | A * | 10/1989 | Franco | A01M 1/04 362/253 |
| 4,876,822 | A | 10/1989 | White | |
| 4,899,485 | A | 2/1990 | Schneidmiller | |
| 4,947,578 | A | 8/1990 | Anderson et al. | |
| 4,949,501 | A * | 8/1990 | Larkin | A01M 1/145 43/113 |
| 4,951,414 | A | 8/1990 | Mewissen | |
| 4,953,320 | A | 9/1990 | Nelson | |
| 5,044,112 | A * | 9/1991 | Williams | A01M 1/145 43/115 |
| D323,014 | S | 1/1992 | Demarest | |
| 5,099,598 | A | 3/1992 | Carter | |
| D326,702 | S | 6/1992 | Demarest | |
| 5,142,815 | A * | 9/1992 | Birdsong | A01M 1/145 43/113 |
| 5,184,417 | A | 2/1993 | Weldon | |
| 5,203,816 | A * | 4/1993 | Townsend | A01M 1/145 43/113 |
| 5,231,790 | A * | 8/1993 | Dryden | A01M 1/145 43/113 |
| RE34,402 | E | 10/1993 | Williams | |
| 5,251,397 | A | 10/1993 | Exum et al. | |
| 5,311,696 | A | 5/1994 | Gauthier et al. | |
| 5,311,697 | A * | 5/1994 | Cavanaugh | A01M 1/08 43/132.1 |
| 5,327,675 | A * | 7/1994 | Butler | A01M 1/14 43/107 |
| 5,335,445 | A | 8/1994 | Kuepper | |
| 5,352,122 | A | 10/1994 | Speyer et al. | |
| 5,353,542 | A | 10/1994 | Vaudry | |
| 5,365,690 | A | 11/1994 | Nelson et al. | |
| D357,725 | S * | 4/1995 | Biasetti | D22/122 |
| 5,425,197 | A * | 6/1995 | Smith | A01M 1/14 43/113 |
| 5,477,636 | A | 12/1995 | Musket | |
| 5,505,017 | A | 4/1996 | Nelson et al. | |
| 5,513,465 | A * | 5/1996 | Demarest | A01M 1/145 43/113 |
| 5,522,008 | A | 5/1996 | Bernard | |
| 5,528,049 | A | 6/1996 | Callahan | |
| 5,556,192 | A | 9/1996 | Wang | |
| 5,572,825 | A | 11/1996 | Gehret | |
| 5,588,250 | A | 12/1996 | Chiba et al. | |
| 5,595,018 | A * | 1/1997 | Wilbanks | A01M 1/223 43/112 |
| 5,608,987 | A * | 3/1997 | Meyer | A01M 1/145 43/113 |
| 5,651,211 | A * | 7/1997 | Regan | A01M 1/145 43/116 |
| 5,657,576 | A | 8/1997 | Nicosia | |
| 5,713,153 | A | 2/1998 | Cook et al. | |
| 5,722,199 | A * | 3/1998 | Demarest | A01M 1/145 43/113 |
| 5,759,561 | A | 6/1998 | Angst et al. | |
| 5,771,628 | A | 6/1998 | Nobbs | |
| 5,799,436 | A | 9/1998 | Nolen et al. | |
| 5,886,292 | A | 3/1999 | Nishimoto | |
| 5,915,940 | A | 6/1999 | Gross et al. | |
| 5,915,948 | A * | 6/1999 | Kunze | A01M 1/145 43/113 |
| 5,926,614 | A | 7/1999 | Steinel | |
| 5,950,355 | A | 9/1999 | Gilbert | |
| D415,242 | S | 10/1999 | Ohmura | |
| 5,974,727 | A | 11/1999 | Gilbert | |
| D418,575 | S | 1/2000 | Ohmura | |
| D422,334 | S | 4/2000 | Engelbrecht | |
| 6,050,025 | A | 4/2000 | Wilbanks | |
| 6,055,766 | A | 5/2000 | Nolen et al. | |
| 6,058,646 | A | 5/2000 | Bishoff et al. | |
| 6,108,965 | A * | 8/2000 | Burrows | A01M 1/145 43/113 |
| 6,134,826 | A * | 10/2000 | Mah | A01M 1/223 43/99 |
| 6,138,402 | A | 10/2000 | Wotton | |
| 6,199,316 | B1 * | 3/2001 | Coventry | A01M 1/2038 43/132.1 |
| 6,203,170 | B1 | 3/2001 | Patrick et al. | |
| 6,361,752 | B1 | 3/2002 | Demarest et al. | |
| 6,375,943 | B1 * | 4/2002 | Raw | C07C 69/75 514/529 |
| D457,591 | S | 5/2002 | Christianson | |
| 6,392,549 | B1 | 5/2002 | Wu | |
| 6,393,759 | B1 * | 5/2002 | Brown | A01M 1/023 43/113 |

(56) References Cited

U.S. PATENT DOCUMENTS

| | | | |
|---|---|---|---|
| 6,397,515 B1* | 6/2002 | Brown | A01M 1/223 43/113 |
| 6,425,202 B1 | 7/2002 | Lin et al. | |
| 6,478,440 B1* | 11/2002 | Jaworski | F21V 23/0442 362/802 |
| 6,481,152 B1* | 11/2002 | Gray | A01M 1/145 43/113 |
| D467,295 S | 12/2002 | Andrews | |
| 6,493,986 B1 | 12/2002 | Nelson et al. | |
| 6,516,559 B1 | 2/2003 | Simchoni et al. | |
| 6,546,667 B1 | 4/2003 | Carter | |
| 6,560,918 B2* | 5/2003 | Nelson | H05C 3/00 43/112 |
| 6,560,919 B2* | 5/2003 | Burrows | A01M 1/145 43/107 |
| 6,594,946 B2 | 7/2003 | Nolen et al. | |
| 6,655,078 B2 | 12/2003 | Winner et al. | |
| 6,718,687 B2 | 4/2004 | Robison | |
| 6,758,009 B1* | 7/2004 | Warner | A01M 1/145 43/113 |
| 6,860,061 B2 | 3/2005 | Nosse et al. | |
| 6,871,443 B2 | 3/2005 | Lambert et al. | |
| 6,886,292 B2* | 5/2005 | Studer | A01M 1/145 43/112 |
| 6,898,896 B1 | 5/2005 | Mcbride et al. | |
| 6,910,298 B2 | 6/2005 | Schneidmiller | |
| 6,951,403 B2 | 10/2005 | Bennett, Jr. | |
| 6,959,510 B1 | 11/2005 | Nelson et al. | |
| D521,102 S | 5/2006 | Hoyes | |
| 7,036,268 B2* | 5/2006 | Taylor | A01M 1/145 43/113 |
| 7,096,621 B2* | 8/2006 | Nelson | A01M 1/145 43/113 |
| D533,930 S | 12/2006 | Keller, Jr. et al. | |
| 7,143,542 B2* | 12/2006 | Taylor | A01M 1/145 43/113 |
| 7,186,016 B2* | 3/2007 | Jao | F21S 10/002 362/101 |
| 7,191,560 B2* | 3/2007 | Harris | A01M 1/14 43/107 |
| 7,383,660 B2* | 6/2008 | Greening | A01M 1/145 43/113 |
| 7,401,436 B2* | 7/2008 | Chyun | A01M 1/145 43/113 |
| 7,412,797 B1 | 8/2008 | Hiscox | |
| 7,503,675 B2 | 3/2009 | Demarest et al. | |
| 7,543,408 B2* | 6/2009 | Lin | A01M 1/223 43/112 |
| 7,591,099 B2 | 9/2009 | Lang et al. | |
| 7,607,255 B2 | 10/2009 | Hu | |
| 7,611,253 B2* | 11/2009 | Chien | F21V 23/02 362/276 |
| 7,614,180 B2 | 11/2009 | Durand et al. | |
| D612,039 S | 3/2010 | Ko et al. | |
| D612,446 S | 3/2010 | Galili | |
| D614,278 S | 4/2010 | Schwartz et al. | |
| 7,784,215 B2* | 8/2010 | Cohnstaedt | A01M 1/04 362/231 |
| 7,788,845 B2 | 9/2010 | Nelson et al. | |
| 7,832,140 B2 | 11/2010 | Wilbanks | |
| D629,500 S | 12/2010 | Koenig | |
| 7,856,752 B1 | 12/2010 | Eilersen | |
| 7,932,482 B2 | 4/2011 | Norwood et al. | |
| 7,937,887 B2 | 5/2011 | Child | |
| 7,988,984 B2 | 8/2011 | Hockaday | |
| 8,016,207 B2 | 9/2011 | Kvietok et al. | |
| 8,079,175 B2* | 12/2011 | Calkins | A01M 1/145 43/115 |
| 8,099,900 B2 | 1/2012 | Rivera | |
| 8,104,223 B1 | 1/2012 | Rodríguez | |
| 8,109,036 B1* | 2/2012 | Wilbanks | A01M 1/223 43/112 |
| 8,135,265 B2 | 3/2012 | Tollens et al. | |
| 8,210,448 B2 | 7/2012 | Kvietok et al. | |
| 8,211,419 B2 | 7/2012 | Siljander et al. | |
| 8,245,438 B2* | 8/2012 | Kelders | E04B 9/006 43/136 |
| D669,151 S | 10/2012 | Frisch | |
| 8,281,514 B2 | 10/2012 | Fleming | |
| 8,291,638 B2* | 10/2012 | Larsen | A01M 1/10 43/136 |
| 8,316,578 B2* | 11/2012 | Faham | A01M 1/14 43/107 |
| 8,341,873 B2 | 1/2013 | Frisch | |
| 8,375,625 B2* | 2/2013 | Larsen | A01M 1/04 114/136 |
| 8,387,306 B2 | 3/2013 | Cink | |
| 8,402,691 B2* | 3/2013 | Coventry | A01M 1/06 43/107 |
| 8,572,890 B1* | 11/2013 | Lark | A01M 1/145 43/113 |
| 8,701,335 B2* | 4/2014 | Larsen | A01M 1/145 43/136 |
| 8,707,614 B2* | 4/2014 | Larsen | A01M 1/145 43/113 |
| 8,709,337 B2 | 4/2014 | Gruenbacher et al. | |
| 8,740,110 B2 | 6/2014 | Gruenbacher | |
| 8,793,928 B2* | 8/2014 | Larsen | A01M 1/145 43/113 |
| 8,800,198 B2* | 8/2014 | Frisch | A01M 1/145 43/113 |
| 8,815,271 B2* | 8/2014 | Yap | A61K 31/506 424/408 |
| 8,845,118 B2 | 9/2014 | Formico et al. | |
| 8,852,501 B2 | 10/2014 | Hedman | |
| 8,935,877 B2 | 1/2015 | Götschi | |
| 9,006,987 B2* | 4/2015 | Maxik | F21S 9/024 362/640 |
| 9,027,276 B2 | 5/2015 | Willcox et al. | |
| 9,089,121 B2 | 7/2015 | Diclaro, II et al. | |
| D736,341 S | 8/2015 | Lieberwirth et al. | |
| 9,327,046 B2 | 5/2016 | Turner et al. | |
| 9,398,765 B2* | 7/2016 | Maloney | A01M 1/14 |
| D780,284 S | 2/2017 | Lieberwirth | |
| D780,285 S | 2/2017 | Lieberwirth | |
| 9,853,677 B2 | 12/2017 | Tramoni | |
| 9,949,472 B2 | 4/2018 | Willcox et al. | |
| D829,302 S | 9/2018 | Rocha et al. | |
| 10,080,357 B2 | 9/2018 | Uchida et al. | |
| 10,143,191 B2* | 12/2018 | Studer | A01M 1/145 |
| 10,188,091 B2* | 1/2019 | Horne | A01M 1/223 |
| D849,878 S | 5/2019 | Lieberwirth | |
| D850,572 S | 6/2019 | Lieberwirth | |
| 10,327,435 B2* | 6/2019 | Studer | A01M 1/145 |
| 10,561,135 B2* | 2/2020 | Sandford | A01M 1/145 |
| 10,568,314 B2* | 2/2020 | Sandford | A01M 1/145 |
| 10,588,307 B2* | 3/2020 | Sandford | A01M 1/106 |
| D890,291 S | 7/2020 | Rocha et al. | |
| 10,798,933 B2* | 10/2020 | Studer | A01M 1/14 |
| 10,888,082 B2* | 1/2021 | Nagata | A01M 1/08 |
| 10,973,217 B2* | 4/2021 | Studer | A01M 1/145 |
| 11,082,664 B2* | 8/2021 | Chien | F21S 8/038 |
| 11,102,972 B2* | 8/2021 | Llorente Alonso | A01M 1/145 |
| 11,311,005 B2* | 4/2022 | Smith | A01M 1/023 |
| 11,399,530 B2* | 8/2022 | Rocha | A01M 1/145 |
| 11,445,716 B2* | 9/2022 | Sandford | A01M 1/04 |
| 11,470,832 B2* | 10/2022 | Rocha | A01M 1/145 |
| 11,484,022 B2* | 11/2022 | Furner | A01M 1/04 |
| 11,533,898 B2* | 12/2022 | Sandford | A01M 1/02 |
| 11,864,547 B2* | 1/2024 | Chang | A01M 1/023 |
| 2001/0042337 A1* | 11/2001 | Lambert | A01M 1/145 43/113 |
| 2002/0020105 A1* | 2/2002 | Sharpe | A01M 1/08 43/111 |
| 2002/0032980 A1* | 3/2002 | Nelson | A01M 1/145 43/113 |
| 2002/0073611 A1* | 6/2002 | Greening | A01M 1/223 43/113 |
| 2002/0078620 A1 | 6/2002 | Nelson et al. | |
| 2002/0139040 A1* | 10/2002 | Burrows | A01M 1/145 43/113 |

(56) References Cited

U.S. PATENT DOCUMENTS

| | | | |
|---|---|---|---|
| 2003/0000126 A1 | 1/2003 | Lenz | |
| 2003/0000127 A1* | 1/2003 | Smith | A01M 1/145 43/113 |
| 2003/0033747 A1 | 2/2003 | Crawley et al. | |
| 2003/0041506 A1* | 3/2003 | Coventry | A01M 1/08 43/132.1 |
| 2003/0051391 A1 | 3/2003 | Jablin | |
| 2003/0056426 A1 | 3/2003 | Nelson | |
| 2003/0070346 A1 | 4/2003 | Winner et al. | |
| 2003/0079398 A1* | 5/2003 | Holmes | A01M 1/145 43/113 |
| 2003/0079658 A1 | 5/2003 | Torrey et al. | |
| 2003/0152483 A1 | 8/2003 | Munagavalasa et al. | |
| 2003/0217503 A1 | 11/2003 | Robison | |
| 2004/0016173 A1 | 1/2004 | Tully et al. | |
| 2004/0025412 A1 | 2/2004 | Simchoni et al. | |
| 2004/0128902 A1 | 7/2004 | Kollars et al. | |
| 2004/0139648 A1 | 7/2004 | Durand et al. | |
| 2004/0200129 A1* | 10/2004 | Studer | A01M 1/145 43/113 |
| 2004/0218380 A1 | 11/2004 | Taylor et al. | |
| 2004/0237381 A1 | 12/2004 | Durand et al. | |
| 2004/0237382 A1 | 12/2004 | Durand et al. | |
| 2005/0019361 A1 | 1/2005 | Durand | |
| 2005/0066570 A1 | 3/2005 | Mosher et al. | |
| 2005/0126068 A1 | 6/2005 | Welch | |
| 2005/0126069 A1 | 6/2005 | Taylor et al. | |
| 2005/0205916 A1 | 9/2005 | Conway et al. | |
| 2005/0210735 A1 | 9/2005 | Harmer et al. | |
| 2005/0274058 A1 | 12/2005 | Miller | |
| 2006/0080888 A1* | 4/2006 | Greening | A01M 1/145 43/113 |
| 2006/0107583 A1 | 5/2006 | Wu | |
| 2006/0150472 A1 | 7/2006 | Harris | |
| 2006/0209530 A1 | 9/2006 | Schaak | |
| 2006/0218851 A1* | 10/2006 | Weiss | A01M 1/08 43/107 |
| 2006/0237439 A1 | 10/2006 | Norwood et al. | |
| 2006/0260183 A1 | 11/2006 | Hockaday | |
| 2006/0283075 A1* | 12/2006 | Feldhege | A01M 1/02 43/121 |
| 2007/0011940 A1 | 1/2007 | Chen et al. | |
| 2007/0012718 A1 | 1/2007 | Schramm et al. | |
| 2007/0039236 A1 | 2/2007 | Geier et al. | |
| 2007/0056208 A1 | 3/2007 | Chen et al. | |
| 2007/0068068 A1* | 3/2007 | Weiss | A01M 1/023 43/132.1 |
| 2007/0107298 A1* | 5/2007 | Miao | A01M 1/145 43/113 |
| 2007/0124987 A1* | 6/2007 | Brown | A01M 1/023 43/113 |
| 2007/0183932 A1 | 8/2007 | Adair et al. | |
| 2007/0194144 A1 | 8/2007 | Davis et al. | |
| 2008/0001551 A1* | 1/2008 | Abbondanzio | H05B 35/00 315/291 |
| 2008/0040967 A1* | 2/2008 | Young | A01M 3/04 43/136 |
| 2008/0118461 A1* | 5/2008 | Boucher, Jr. | A01N 43/90 424/84 |
| 2008/0134568 A1 | 6/2008 | Cowan et al. | |
| 2008/0141578 A1 | 6/2008 | Chen et al. | |
| 2008/0141579 A1 | 6/2008 | Caprotti et al. | |
| 2008/0168702 A1* | 7/2008 | Jaffrey | A01M 1/223 43/118 |
| 2008/0196296 A1 | 8/2008 | Studer et al. | |
| 2008/0229652 A1* | 9/2008 | Willcox | A01M 1/145 43/113 |
| 2008/0236028 A1 | 10/2008 | Mcbride et al. | |
| 2008/0257075 A1 | 10/2008 | Ropiak et al. | |
| 2009/0025275 A1* | 1/2009 | Cohnstaedt | A01M 1/04 43/113 |
| 2009/0038207 A1* | 2/2009 | Lin | A01M 1/04 43/112 |
| 2009/0100743 A1* | 4/2009 | Prater | A01M 1/223 43/112 |
| 2009/0145019 A1 | 6/2009 | Nolen et al. | |
| 2009/0223115 A1 | 9/2009 | Lang et al. | |
| 2009/0288333 A1* | 11/2009 | Johnston | A01M 1/02 43/107 |
| 2010/0024278 A1* | 2/2010 | Simchoni-Barak | A01M 1/145 43/107 |
| 2010/0071254 A1* | 3/2010 | Calkins | A01M 1/145 43/107 |
| 2010/0181319 A1 | 7/2010 | Deflorian et al. | |
| 2010/0229459 A1 | 9/2010 | Simchoni-barak et al. | |
| 2010/0236133 A1* | 9/2010 | Frisch | A01M 1/145 43/113 |
| 2010/0263260 A1* | 10/2010 | Engelbrecht | A01M 1/02 43/107 |
| 2010/0287816 A1 | 11/2010 | Abelbeck | |
| 2011/0030267 A1 | 2/2011 | Nolen et al. | |
| 2011/0041384 A1 | 2/2011 | Willcox et al. | |
| 2011/0041385 A1 | 2/2011 | Soltis | |
| 2011/0078942 A1 | 4/2011 | Larsen | |
| 2011/0138678 A1 | 6/2011 | Smith | |
| 2011/0214340 A1* | 9/2011 | Klein | A01K 39/0113 43/114 |
| 2011/0302821 A1* | 12/2011 | Casagrande | A01M 1/103 43/58 |
| 2012/0124890 A1 | 5/2012 | Hainze | |
| 2012/0167450 A1* | 7/2012 | Frisch | A01M 1/145 43/113 |
| 2012/0186136 A1 | 7/2012 | Schneidmiller et al. | |
| 2012/0186137 A1 | 7/2012 | Schneidmiller et al. | |
| 2012/0204475 A1 | 8/2012 | Schneidmiller et al. | |
| 2012/0246998 A1 | 10/2012 | Vasudeva et al. | |
| 2012/0266519 A1 | 10/2012 | Wright | |
| 2012/0294828 A1 | 11/2012 | Zhang et al. | |
| 2013/0019348 A1* | 1/2013 | Crouse | C07D 405/12 514/369 |
| 2013/0097918 A1 | 4/2013 | Coventry | |
| 2013/0145680 A1 | 6/2013 | Soltis et al. | |
| 2013/0152451 A1 | 6/2013 | Larsen | |
| 2013/0180161 A1 | 7/2013 | Vasudeva et al. | |
| 2013/0212926 A1 | 8/2013 | Mcgavin | |
| 2013/0265743 A1* | 10/2013 | Lee | A61L 9/044 362/640 |
| 2013/0302269 A1* | 11/2013 | Gomez | A01N 25/10 43/107 |
| 2013/0312314 A1 | 11/2013 | Greening et al. | |
| 2013/0318854 A1 | 12/2013 | Zhang et al. | |
| 2014/0013651 A1* | 1/2014 | Moss | A01M 23/005 43/58 |
| 2014/0026467 A1 | 1/2014 | Kaye | |
| 2014/0075824 A1 | 3/2014 | Roulston et al. | |
| 2014/0134371 A1 | 5/2014 | Hoffmann et al. | |
| 2014/0137462 A1 | 5/2014 | Rocha | |
| 2014/0165452 A1 | 6/2014 | Rocha | |
| 2015/0201603 A1 | 7/2015 | Willcox et al. | |
| 2016/0000060 A1* | 1/2016 | Sandford | A01M 1/145 43/132.1 |
| 2016/0029635 A1* | 2/2016 | Lo | C07D 209/50 424/408 |
| 2016/0029636 A1* | 2/2016 | Lo | C07C 233/14 424/408 |
| 2016/0037779 A1* | 2/2016 | Lo | A01N 53/00 424/408 |
| 2016/0262367 A1* | 9/2016 | Sandford | A01M 1/145 |
| 2016/0345569 A1 | 12/2016 | Freudenberg et al. | |
| 2017/0006847 A1 | 1/2017 | Mcgowan et al. | |
| 2017/0035039 A1* | 2/2017 | Sandford | A01M 1/023 |
| 2017/0295772 A1* | 10/2017 | Studer | A01M 1/145 |
| 2017/0303523 A1* | 10/2017 | Sandford | F21S 8/035 |
| 2018/0027794 A1* | 2/2018 | Hortel | A01M 1/2011 |
| 2018/0184635 A1 | 7/2018 | Studer et al. | |
| 2018/0199562 A1 | 7/2018 | Willcox et al. | |
| 2018/0235202 A1 | 8/2018 | Sandford et al. | |
| 2018/0310543 A1* | 11/2018 | Holmes | A01M 1/106 |
| 2018/0368385 A1 | 12/2018 | Gilbert, II | |
| 2019/0008133 A1 | 1/2019 | Llorente Alonso et al. | |
| 2019/0045771 A1 | 2/2019 | Rocha et al. | |

(56) References Cited

U.S. PATENT DOCUMENTS

| | | | |
|---|---|---|---|
| 2019/0133105 A1 | 5/2019 | Leach et al. | |
| 2019/0141978 A1 | 5/2019 | Smith | |
| 2019/0174736 A1 | 6/2019 | Smith | |
| 2019/0261616 A1 | 8/2019 | Studer et al. | |
| 2019/0327952 A1* | 10/2019 | Jalowiec | A01M 1/02 |
| 2019/0350184 A1 | 11/2019 | Chang et al. | |
| 2019/0357516 A1 | 11/2019 | Chang et al. | |
| 2020/0037595 A1* | 2/2020 | Cook | A01M 1/2005 |
| 2020/0113165 A1 | 4/2020 | Sandford et al. | |
| 2020/0138004 A1* | 5/2020 | Sandford | A01M 1/145 |
| 2020/0138005 A1 | 5/2020 | Sandford et al. | |
| 2020/0138006 A1 | 5/2020 | Sandford et al. | |
| 2020/0146273 A1 | 5/2020 | Chang et al. | |
| 2020/0214279 A1 | 7/2020 | Tsai et al. | |
| 2020/0214280 A1 | 7/2020 | Sandford et al. | |
| 2020/0245606 A1* | 8/2020 | Rocha | A01M 1/145 |
| 2021/0105991 A1* | 4/2021 | Furner | A01M 1/145 |
| 2022/0053750 A1* | 2/2022 | Caballero Tapia | A01M 1/145 |
| 2022/0061301 A1* | 3/2022 | Smith | A01M 1/145 |
| 2023/0301291 A1* | 9/2023 | Zhang | B32B 1/00 |

FOREIGN PATENT DOCUMENTS

| | | | | |
|---|---|---|---|---|
| AU | 2009208773 B2 | | 9/2014 | |
| BR | 9400882 A | | 10/1995 | |
| CA | 2447854 A1 | | 11/2001 | |
| CA | 2533004 C | | 9/2013 | |
| CH | 255022 A | | 6/1948 | |
| CN | 2086052 U | | 10/1991 | |
| CN | 2093515 U | | 1/1992 | |
| CN | 2098796 U | | 3/1992 | |
| CN | 2144926 Y | | 11/1993 | |
| CN | 2267648 Y | | 11/1997 | |
| CN | 2281653 Y | | 5/1998 | |
| CN | 2315779 Y | | 4/1999 | |
| CN | 2357509 Y | | 1/2000 | |
| CN | 2410872 Y | | 12/2000 | |
| CN | 2427068 Y | | 4/2001 | |
| CN | 2439782 Y | | 7/2001 | |
| CN | 2449483 Y | | 9/2001 | |
| CN | 2452297 Y | | 10/2001 | |
| CN | 1325264 A | | 12/2001 | |
| CN | 1395827 A | | 2/2003 | |
| CN | 1111351 C | | 6/2003 | |
| CN | 2596758 Y | | 1/2004 | |
| CN | 2712358 Y | | 7/2005 | |
| CN | 2790173 Y | | 6/2006 | |
| CN | 2838284 Y | | 11/2006 | |
| CN | 101170900 A | | 4/2008 | |
| CN | 201067044 Y | | 6/2008 | |
| CN | 201093261 Y | | 7/2008 | |
| CN | 101243785 A | | 8/2008 | |
| CN | 201107985 Y | | 9/2008 | |
| CN | 201107993 Y | | 9/2008 | |
| CN | 201163944 Y | | 12/2008 | |
| CN | 201204885 Y | | 3/2009 | |
| CN | 201234518 Y | | 5/2009 | |
| CN | 201451115 U * | | 5/2010 | |
| CN | 101743943 A | | 6/2010 | |
| CN | 201509526 U | | 6/2010 | |
| CN | 201577439 U | | 9/2010 | |
| CN | 201813749 U | | 5/2011 | |
| CN | 102246798 A | | 11/2011 | |
| CN | 202077503 U | | 12/2011 | |
| CN | 102325443 A | | 1/2012 | |
| CN | 202112193 U | | 1/2012 | |
| CN | 202285958 U | | 7/2012 | |
| CN | 202551965 U | | 11/2012 | |
| CN | 202588119 U | | 12/2012 | |
| CN | 103168765 A | | 6/2013 | |
| CN | 203072705 U | | 7/2013 | |
| CN | 203505369 U | | 4/2014 | |
| CN | 203884506 U | | 10/2014 | |
| CN | 203952202 U | | 11/2014 | |
| CN | 204047693 U * | | 12/2014 | |
| CN | 204393146 U | | 6/2015 | |
| CN | 205596962 U * | | 9/2016 | |
| CN | 205671318 U * | | 11/2016 | |
| CN | 209359419 U * | | 9/2019 | |
| CN | 209862049 U * | | 12/2019 | |
| CN | 213272267 U * | | 5/2021 | |
| CN | 214206918 U * | | 9/2021 | |
| CN | 215602786 U * | | 1/2022 | |
| DE | 702467 C | | 2/1941 | |
| DE | 3225412 A1 | | 1/1984 | |
| DE | 8802934 U1 | | 6/1988 | |
| DE | 3840440 A1 * | | 10/1989 | |
| DE | 29816743 U1 | | 1/1999 | |
| DE | 10236531 A1 * | | 2/2004 | A01M 1/145 |
| EP | 0947134 A2 | | 10/1999 | |
| EP | 0976323 A2 | | 2/2000 | |
| EP | 1161865 A2 | | 12/2001 | |
| EP | 1213958 B1 | | 11/2003 | |
| EP | 1827092 B1 | | 12/2010 | |
| EP | 2807921 A1 | | 12/2014 | |
| EP | 1937908 B1 * | | 6/2016 | A01M 1/145 |
| FR | 385129 A | | 5/1908 | |
| FR | 422209 A | | 3/1911 | |
| FR | 25121 E | | 12/1922 | |
| FR | 40788 E | | 8/1932 | |
| FR | 751672 A | | 9/1933 | |
| FR | 840852 A | | 5/1939 | |
| FR | 853213 A | | 3/1940 | |
| FR | 974742 A | | 2/1951 | |
| FR | 1098139 A | | 7/1955 | |
| FR | 1396573 A | | 4/1965 | |
| FR | 1425806 A * | | 1/1966 | |
| FR | 2900793 A1 | | 11/2007 | |
| GB | 191201297 A | | 8/1912 | |
| GB | 380380 A | | 9/1932 | |
| GB | 398636 A | | 9/1933 | |
| GB | 2171882 A | | 9/1986 | |
| GB | 2373705 B | | 10/2002 | |
| GB | 2381181 A * | | 4/2003 | A01M 1/145 |
| GB | 2420957 A * | | 6/2006 | A01M 1/04 |
| GB | 2456585 A * | | 7/2009 | A01M 1/145 |
| GB | 2457103 A | | 8/2009 | |
| GB | 2545631 A * | | 6/2017 | A01M 1/02 |
| GB | 2587831 A * | | 4/2021 | A01M 1/04 |
| IN | 2011CH01965 A | | 11/1965 | |
| IN | 173469 B | | 5/1994 | |
| IN | 201482 B | | 2/2007 | |
| IN | 197003 B | | 1/2008 | |
| JP | 55-170987 | | 5/1979 | |
| JP | S6455137 A | | 3/1989 | |
| JP | H0543832 A | | 2/1993 | |
| JP | H06245676 A | | 9/1994 | |
| JP | H077457 A | | 1/1995 | |
| JP | U1995007457 | | 2/1995 | |
| JP | H07123894 A | | 5/1995 | |
| JP | 08047361 A * | | 2/1996 | |
| JP | H09506767 A | | 7/1997 | |
| JP | H10229801 A | | 9/1998 | |
| JP | H11146751 A | | 6/1999 | |
| JP | H11289951 A | | 10/1999 | |
| JP | 11332446 A * | | 12/1999 | |
| JP | H11332446 A | | 12/1999 | |
| JP | 2000253793 A | | 9/2000 | |
| JP | 2000270749 A | | 10/2000 | |
| JP | 2000287600 A | | 10/2000 | |
| JP | 2000333582 A | | 12/2000 | |
| JP | 2001269105 A * | | 10/2001 | |
| JP | 2001299179 A | | 10/2001 | |
| JP | 2002084958 A | | 3/2002 | |
| JP | 2002125560 A | | 5/2002 | |
| JP | 2002125561 A | | 5/2002 | |
| JP | 2002209496 A | | 7/2002 | |
| JP | 2002253101 A | | 9/2002 | |
| JP | 2003009744 A | | 1/2003 | |
| JP | 2003199471 A * | | 7/2003 | |
| JP | 2004159626 A | | 6/2004 | |
| JP | 2004305162 A | | 11/2004 | |
| JP | 2005046100 A | | 2/2005 | |
| JP | 2005065630 A | | 3/2005 | |

(56) References Cited

FOREIGN PATENT DOCUMENTS

| | | | |
|---|---|---|---|
| JP | 2005095149 A | 4/2005 | |
| JP | 2005245312 A | 9/2005 | |
| JP | 3746430 B2 | 2/2006 | |
| JP | 2006149252 A * | 6/2006 | |
| JP | 2007074908 A | 3/2007 | |
| JP | 2008154500 A | 7/2008 | |
| JP | 4166358 B2 | 10/2008 | |
| JP | 4549722 B2 | 7/2010 | |
| JP | 2012045004 A | 3/2012 | |
| JP | 2012115182 A * | 6/2012 | |
| JP | 5149183 B2 | 12/2012 | |
| JP | 2012239443 A * | 12/2012 | |
| JP | 2014195466 A | 10/2014 | |
| KR | 20080100721 A | 11/2008 | |
| KR | 20100000899 U | 1/2010 | |
| KR | 20100033336 A * | 3/2010 | |
| KR | 20110050769 A | 12/2012 | |
| KR | 20120132880 A | 12/2012 | |
| KR | 20130049475 A | 5/2013 | |
| KR | 20150112755 A | 10/2016 | |
| RU | 2360413 C2 | 7/2009 | |
| WO | WO-7900574 A1 * | 8/1979 | |
| WO | 8200567 A1 | 3/1982 | |
| WO | 9012501 A1 | 11/1990 | |
| WO | 9217060 A1 | 10/1992 | |
| WO | 9615664 A1 | 5/1996 | |
| WO | 9853677 A1 | 12/1998 | |
| WO | WO-9934671 A1 * | 7/1999 | ............ A01M 1/02 |
| WO | 0003588 A1 | 1/2000 | |
| WO | 2000003588 A1 | 1/2000 | |
| WO | 0122813 A2 | 4/2001 | |
| WO | 0168154 A1 | 9/2001 | |
| WO | 0212127 A2 | 2/2002 | |
| WO | 0220224 A1 | 3/2002 | |
| WO | 2001089295 81 | 9/2002 | |
| WO | 03032722 A1 | 4/2003 | |
| WO | 2004068944 A2 | 8/2004 | |
| WO | 2004071935 A2 | 8/2004 | |
| WO | WO-2005053389 A1 * | 6/2005 | ............ A01M 1/145 |
| WO | 2005082139 A1 | 9/2005 | |
| WO | 2008062612 A1 | 5/2008 | |
| WO | WO-2008096352 A2 * | 8/2008 | ............ A01M 1/02 |
| WO | 2009040528 A1 | 4/2009 | |
| WO | 2009075839 A1 | 6/2009 | |
| WO | 2008096352 A3 | 1/2010 | |
| WO | 2011016361 A1 | 2/2011 | |
| WO | WO-2011094219 A1 * | 8/2011 | ............ A01N 25/28 |
| WO | 2014134371 A1 | 9/2014 | |
| WO | 2015081033 A1 | 6/2015 | |
| WO | 2015164849 A1 | 10/2015 | |
| WO | 2018025426 A1 | 2/2018 | |
| WO | WO-2019112831 A1 * | 6/2019 | |
| WO | WO-2019112833 A1 * | 6/2019 | |
| WO | WO-2020079414 A1 * | 4/2020 | ............ A01M 1/14 |
| WO | 2020136173 A1 | 7/2020 | |
| WO | WO-2020163364 A1 * | 8/2020 | ............ A01M 1/10 |

OTHER PUBLICATIONS

EPO Search Report and Opinion for 14757204.4 dated Oct. 24, 2016, 8 pages.
PCT Supplementary Search Report and Written Opinion for PCT/US2014/019175 dated Jun. 17, 2014, 22 pages.
EPO Search Report and Opinion for 18182519.1 dated Nov. 28, 2018, 6 pages.
All Office Actions: U.S. Appl. No. 15/960,648, filed Apr. 24, 2018.
All Office Actions; U.S. Appl. No. 16/716,534, filed Dec. 17, 2019.
Enforcer® Over Nite Flea and Insect Trap, website: http://www.enforcer.com/products/flea-tick/over-nite-flea-insect-trap/.
Fly Web USA, Silent fly control, website http://flywebusa.com/.
http://aosion.en.alibaba.com/product/60164539799-802806511/Aosion_electronic_ultrasonic_pest_mosquito_repelle_killer.html?spm=a2700.8304367.prsea43447.162.55cc9aecFS3w2g, Dec. 5, 2014, 1 Page.
Lowe's Insecticides, The Courier-Journal (Louisville, Kentucky), Jul. 16, 1997, p. 231.
On-line article in the Atlanta Journal Constitution, Jul. 9, 1993 by Leigh Ann Miller describing a new product, the Enforcer® Over Nite Flea and Insect Trap, 2 page.
Plug-in Stiky Fly Trap, Olson Products Inc., PO Box 1043, Median OH 44258, www.olsonproducts.com.

* cited by examiner

INSECT TRAP DEVICE AND METHOD OF USING

CROSS REFERENCE TO RELATED APPLICATIONS

This application is a continuation of U.S. patent application Ser. No. 16/716,534 filed Dec. 17, 2019, which is a continuation of U.S. patent application Ser. No. 15/960,648 filed Apr. 24, 2019, now US issued U.S. Pat. No. 11,445,716, a continuation of U.S. patent application Ser. No. 14/771,611 filed Aug. 31, 2015, which is a 371 filing of international application PCT/US2014/019175 filed Feb. 28, 2014, which claims the benefit of U.S. Provisional Applications No. 61/787,629, filed Mar. 15, 2013 and U.S. Provisional Application No. 61/771,774, filed Mar. 1, 2013, which applications are incorporated herein by reference.

TECHNICAL FIELD

The present disclosure is related generally to an insect trap, more particularly, to a removable insect trap having a minimal footprint and an aesthetically pleasing design.

BACKGROUND

Flying insect pests have long been a nuisance and a health hazard. Since ancient times, insect traps have been used to eliminate flying insects, and hundreds of different traps have been proposed and developed over the centuries. There has always been a need to eliminate flies and mosquitos that inevitably find their way into homes. Recent US outbreaks of Eastern Equine Encephalitis, West Nile virus and harmful E. Coli infections, public health threats that can be spread by flying insects, have only increased this need. Because insects may see and be attracted to a combination of ultraviolet (UV) and visible light, an indoor insect trap may have its own UV and visible light sources. Insect traps commonly have a fluorescent tube that emits both UV and visible light to attract insects and a glue board to trap them. However, insect traps incorporating fluorescent tubes and the transformers that power them may be too large to fit wherever they're needed and too expensive to afford one for every room in the house. In addition, insects may contact the fluorescent tube and over time it may accumulate dust and insect debris, blocking the light and reducing the trap's effectiveness. Furthermore, the glue board may be difficult to remove and replace without touching trapped insects and adhesive.

SUMMARY

An insect trap device and methods of using the device are described herein. The insect trap may effectively attract and trap insects indoors and may be manufactured and sold at a lower cost than commercially available traps. The insect trap device may be smaller than competing indoor insect traps, and may be conveniently movable from one location to another. The insect trap device may be easier to clean and maintain without contacting trapped insects.

In a first aspect, an insect trap is disclosed including: a trap portion including an enclosure having an adhesive surface and a first opening, wherein the adhesive surface is at least partially contained within the enclosure and is configured to adhere to an insect; and a base portion including a lighting element and a mounting portion, wherein the lighting element is configured to provide light to the trap portion, and wherein the mounting portion is configured to communicate with and receive power from a power source; wherein the trap portion is configured to removably engage with the base portion and receive light from the base portion when engaged therewith. In an embodiment of the first aspect, the first opening is configured to allow an insect to enter into the enclosure. In an embodiment of the first aspect, the enclosure includes a second opening, the second opening configured to allow light to emit from the enclosure. In an embodiment of the first aspect, within the base portion, the light is not manipulated. In an embodiment of the first aspect, the enclosure includes a third opening, the third opening configured to allow light to be received from base portion into the enclosure. In an embodiment of the first aspect, wherein the enclosure is configured to distribute the light in a predetermined pattern. In an embodiment of the first aspect, the enclosure includes: a front housing portion having a first internal surface; and a rear housing portion having a second internal surface, wherein the front housing portion and rear housing portion are matingly engaged with each other to form the enclosure; and wherein at least one of the first or second internal surfaces is configured to manipulate light. In an embodiment of the first aspect, at least one of the first or second internal surfaces includes an adhesive surface. In an embodiment of the first aspect, the rear housing portion has a concave surface, the concave surface configured to reflect light evenly within the enclosure. In an embodiment of the first aspect, light is transmitted through the adhesive surface, illuminating the adhesive surface to attract an insect to the adhesive surface. In an embodiment of the first aspect, the enclosure includes: a front housing portion having a first internal surface; a rear housing portion having a second internal surface; and a divider portion disposed at least partially between the front housing portion and rear housing portion, wherein the front housing portion and rear housing portion are matingly engaged with each other to form the enclosure; and wherein the divider portion divides the enclosure into a front enclosure portion and a rear enclosure portion. In an embodiment of the first aspect, the divider portion includes a rear surface including translucent material and includes a front surface including an adhesive surface. In an embodiment of the first aspect, the second internal surface of the rear housing portion includes a concave surface, the concave surface configured to reflect light onto the rear surface of the divider portion. In an embodiment of the first aspect, light is transmitted through the adhesive surface, illuminating the adhesive surface to attract an insect to the adhesive surface. In an embodiment of the first aspect, the rear surface of the divider portion is configured to receive the light from the second internal surface of the rear housing portion or directly from the lighting element. In an embodiment of the first aspect, the divider portion is configured to receive light at an oblique angle and spread across the divider portion. In an embodiment of the first aspect, the divider portion is configured to manipulate light. In an embodiment of the first aspect, the divider portion includes a planar or contoured shape, wherein the shape of the divider portion is configured to optimize light distribution. In an embodiment of the first aspect, the base portion includes a protrusion and wherein the trap portion includes a recess for receiving the protrusion, wherein when the protrusion is received by the trap portion, the base portion and trap portion are engaged. In an embodiment of the first aspect, the trap portion includes a protrusion and wherein the base portion includes a recess for receiving the protrusion, wherein when the protrusion is received by the base portion, the base portion and trap portion are engaged. In an embodiment of the first aspect, the trap portion includes a polymeric, fibrous, or carbon-based material. In an embodiment of the first aspect, the mounting portion includes an electrical plug having rigid conductors protruding substantially perpendicularly and directly from the rear surface of the mounting portion, wherein the conductors are insertable into an electrical power outlet. In an embodiment of the first aspect, the power source includes an electrical power outlet or a battery. In an embodiment of the first aspect, the lighting element includes a light emitting diode (LED). In an embodiment of the first aspect, the lighting element includes an ultraviolet (UV) LED and a blue LED. In an embodiment of the first aspect, the base portion includes an energy stabilizer configured to provide a constant voltage to the lighting element. In an embodiment of the first aspect, the energy stabilizer includes full rectifier circuit. In an embodiment of the first aspect, the base portion includes an opening, the opening configured to allow light to emit from the base portion to the trap portion. In an embodiment of the first aspect, the opening includes a transparent or translucent window. In an embodiment of the first aspect, the opening is proximate to the lighting element. In an embodiment of the first aspect, the trap portion includes an insect attractant. In an embodiment of the first aspect, the insect attractant is selected from the group consisting of: sorbitol, coleopteran attractants, dipteran attractants, homopteran attractants, lepidopteran, straight chain lepidopteran pheromones, eugenol, methyl eugenol, and siglure. In an embodiment of the first aspect, the coleopteran attractants include brevicomin, dominicalure, frontalin, grandlure, ipsdienol, ipsenol, japonilure, lineatin, megatomoic acid, multistriatin, oryctalure, sulcatol, and trunc-call. In an embodiment of the first aspect, the dipteran attractants include ceralure, cue-lure, latilure, medlure, moguchun, muscalure, and trimedlure. In an embodiment of the first aspect, the homopteran attractants include rescalure. In an embodiment of the first aspect, the lepidopteran attractants include disparlure. In an embodiment of the first aspect, the straight chain lepidopteran pheromones include codlelure, gossyplure, hexalure, litlure, looplure, orfralure, and ostramone. In an embodiment of the first aspect, the insect attractant is integral to the enclosure. In an embodiment of the first aspect, the base portion includes a transmitter. In an embodiment of the first aspect, the transmitter includes a piezoelectric speaker configured to emit an insect-attracting sound. In an embodiment of the first aspect, the insect-attracting sound includes frequencies in the range of approximately 0.2 Hz to 240 KHz. In an embodiment of the first aspect, the base includes a switch, the switch configured to allow a user to control a property of the trap. In an embodiment of the first aspect, the property is selected from the group consisting of: power, light intensity, light wavelength or frequency, light flickering, light patterns, and combinations thereof. In an embodiment of the first aspect, the switch includes a mechanical switch, an optical switch, an electronic switch, an electromechanical switch, or a Hall effect sensor. In an embodiment of the first aspect, the enclosure includes a reflective surface. In an embodiment of the first aspect, the adhesive surface is proximate to the reflective surface. In an embodiment of the first aspect, the base portion includes a circuit configured to a varying voltage to the lighting element, wherein the lighting element provides intermittent light to the trap portion. In an embodiment of the first aspect, the enclosure includes an outer surface, the outer surface at least partially surrounded by sleeve that is configured to reduce the amount of light emitted by the enclosure. In an embodiment of the first aspect, the at least one of the first or second internal surfaces includes a textured surface, the textured surface configured to increase the surface area of the enclosure. In an embodiment of the first aspect, the textured surfaces include ribs extending at least a portion of the length of the first or second internal surfaces. In an embodiment of the first aspect, the at least one of the first or second internal surfaces include a textured surface, the textured surface configured to increase the surface area of the enclosure. In an embodiment of the first aspect, the textured surfaces include ribs extending at least a portion of the length of the first or second internal surfaces. In an embodiment of the first aspect, the trap further includes: a light conducting body located proximate to the second internal surface of the rear housing portion, the light conducting body having a front surface and a rear surface and the light conducting body configured to receive light from the base portion and distribute the light in a predetermined pattern in the enclosure. In an embodiment of the first aspect, the front surface of the light conducting body further includes an adhesive material. In an embodiment of the first aspect, the rear surface of the light reflecting body is configured to reduce the amount of light from being emitted in a predetermined direction. In an embodiment of the first aspect, the light conducting body is tapered, having a thicker depth at a portion proximate to the base portion and a thinner depth at an opposite end. In an embodiment of the first aspect, the rear surface of the light conducting body is configured to reflect light into the light conducting body. In an embodiment of the first aspect, light is reflected multiple times within the light conducting body before being emitted into the enclosure. In an embodiment of the first aspect, the rear surface includes a rear cover or a matte layer. In an embodiment of the first aspect, the base portion further includes an optical enhancer, the optical enhancer configured to direct the light into the trap portion in a predetermined pattern. In an embodiment of the first aspect, the optical enhancer includes a lens. In an embodiment of the first aspect, the enclosure includes an inner sleeve and the base portion includes an outer sleeve, the inner sleeve configured to align with the outer sleeve. In an embodiment of the first aspect, the outer sleeve includes a face plate having an opening. In an embodiment of the first aspect, the face plate opening corresponds to an enclosure opening, the openings providing an alignment means. In an embodiment of the first aspect, the inner sleeve is configured to be dropped into the outer sleeve. In an embodiment of the first aspect, the inner sleeve includes a tab for holding on to the inner sleeve. In an embodiment of the first aspect, the base portion includes a docking switch, the docking switch configured to activate the lighting element when the trap portion is correctly engaged with the base portion. In an embodiment of the first aspect, the trap portion includes a docking switch activator, the docking switch activator configured to activate the docking switch when the trap portion is correctly engaged with the base portion. In an embodiment of the first aspect, the docking switch includes a mechanical switch, an optical switch, an electronic switch, an electromechanical switch, or a Hall effect sensor.

In a second aspect, an insect trap is disclosed including: a trap portion including: an enclosure having an adhesive surface and a first opening, wherein the adhesive surface is at least partially contained within the enclosure and is configured to adhere to an insect, and a lighting element at least partially contained within the enclosure, wherein the lighting element is configured to provide light within the enclosure and wherein the lighting element is configured to communicate with and receive power from a power source;

and a base portion configured to removably engage the trap portion and provide access to the power source. In an embodiment of the second aspect, the lighting element includes a plurality of electrical trap contacts and wherein the base portion includes a plurality of electrical base contacts, the trap contacts configured to communicate with the base contacts to provide power to the lighting element. In an embodiment of the second aspect, the base contacts are in communication with the power source. In an embodiment of the second aspect, the lighting element includes a light emitting diode (LED).

In a third aspect, a removable insect trap cartridge is disclosed including: an enclosure defining the cartridge, the enclosure having an adhesive surface and a first opening, wherein the adhesive surface is at least partially contained within the enclosure and is configured to adhere to an insect, wherein the first opening is configured to allow an insect to enter the enclosure, and wherein the enclosure is configured to provide light in a predetermined pattern within the enclosure. In an embodiment of the third aspect, the enclosure further includes a lighting element. In an embodiment of the third aspect, the lighting element includes a light emitting diode (LED). In an embodiment of the third aspect, the lighting element includes an ultraviolet (UV) LED and a blue LED. In an embodiment of the third aspect, the enclosure includes: a front housing portion having a first internal surface; and a rear housing portion having a second internal surface, wherein the front housing portion and rear housing portion are matingly engaged with each other to form the enclosure; and wherein at least one of the first or second internal surfaces is configured to manipulate light. In an embodiment of the third aspect, at least one of the first or second internal surfaces includes an adhesive surface. In an embodiment of the third aspect, the rear housing portion has a concave surface, the concave surface configured to reflect light evenly within the enclosure. In an embodiment of the third aspect, light is transmitted through the adhesive surface, illuminating the adhesive surface to attract an insect to the adhesive surface. In an embodiment of the third aspect, the enclosure includes: a front housing portion having a first internal surface; a rear housing portion having a second internal surface; and a divider portion disposed at least partially between the front housing portion and rear housing portion, wherein the front housing portion and rear housing portion are matingly engaged with each other to form the enclosure; and wherein the divider portion divides the enclosure into a front enclosure portion and a rear enclosure portion. In an embodiment of the third aspect, the divider portion includes a rear surface having translucent material and includes a front surface having an adhesive surface. In an embodiment of the third aspect, the second internal surface of the rear housing portion includes a concave surface, the concave surface configured to reflect light onto the rear surface of the divider portion. In an embodiment of the third aspect, light is transmitted through the adhesive surface, illuminating the adhesive surface to attract an insect to the adhesive surface. In an embodiment of the third aspect, the rear surface of the divider portion is configured to receive the light from the second internal surface of the rear housing portion or directly from a lighting element. In an embodiment of the third aspect, the enclosure includes a bottom surface, the bottom surface configured to be removably received in a pluggable base. In an embodiment of the third aspect, wherein the enclosure includes biodegradable materials. In an embodiment of the third aspect, the enclosure includes an outer surface, the outer surface including a decorative element. In an embodiment of the third aspect, the decorative element includes a shape selected from the group consisting of: a flower, a plant, a shell, a company logo, a sports team logo, a football, a basketball, a soccer ball, a hockey puck, a football helmet or a hockey stick. In an embodiment of the third aspect, the trap portion includes an insect attractant. In an embodiment of the third aspect, the insect attractant is selected from the group consisting of: sorbitol, coleopteran attractants, dipteran attractants, homopteran attractants, lepidopteran, straight chain lepidopteran pheromones, eugenol, methyl eugenol, and siglure. In an embodiment of the third aspect, the insect attractant is detectable by an insect at a distance of approximately 2 meters from the cartridge. In an embodiment of the third aspect, the enclosure includes a textured surface, the textured surface configured to increase the surface area of the enclosure. In an embodiment of the third aspect, the textured surface includes ribs extending at least a portion of the length of the enclosure. In an embodiment of the third aspect, the cartridge further includes: a light conducting body located within the enclosure, the light conducting body configured to receive light and distribute the light in a predetermined pattern in the enclosure. In an embodiment of the third aspect, the enclosure includes an inner sleeve that is configured to be received into and aligned with an outer sleeve. In an embodiment of the third aspect, the outer sleeve includes a face plate having an opening. In an embodiment of the third aspect, the face plate opening corresponds to an enclosure opening, the openings providing an alignment means. In an embodiment of the third aspect, the inner sleeve includes a tab for holding on to the inner sleeve. In an embodiment of the third aspect, the cartridge includes a docking switch activator, the docking switch activator configured to activate a docking switch when the cartridge is correctly engaged with a base portion. In an embodiment of the third aspect, the docking switch activator includes a mechanical switch, an optical switch, an electronic switch, an electromechanical switch, or a Hall effect sensor.

In a fourth aspect, a method is disclosed including: providing a base portion of an insect trap; providing a first trap portion of an insect trap, wherein the first trap portion includes an opening; mounting the first trap portion to the base portion; coupling the base portion to a power source to provide power to a lighting element, wherein the lighting element is within the base portion or first trap portion and wherein the lighting element is configured to attract an insect into the first trap portion; and receiving an insect into the first trap portion through the opening. In an embodiment of the fourth aspect, the method further includes: separating the first trap portion from the base portion; and disposing of the first trap portion, wherein the insect remains in the disposed first trap portion. In an embodiment of the fourth aspect, the first trap portion is disposed without the human contact with the insect in the first trap portion. In an embodiment of the fourth aspect, the first trap portion includes an adhesive surface and wherein the insect adheres to the adhesive surface. In an embodiment of the fourth aspect, the base portion includes a docking switch, wherein the docking switch is configured to activate the lighting element when the first trap portion is correctly mounted to the base portion. In an embodiment of the fourth aspect, upon separating the first trap portion from the base portion, the lighting element is powered off. In an embodiment of the fourth aspect, upon separating the first trap portion from the base portion, the lighting element is partially shielded from emitting light. In an embodiment of the fourth aspect, the method further includes: providing a second trap portion of an insect trap, wherein the second trap portion includes an opening; and mounting the second trap portion to the base portion. In an embodiment of the fourth aspect, the first insect trap and second insect trap have different configurations.

In a fifth aspect, a docking apparatus is disclosed including: a docking structure configured to activate in response to a docking activator, the docking activator located on a separate piece configured to engage the docking structure, wherein the docking structure is in communication with a power source and is configured to control power to a lighting element. In an embodiment of the fifth aspect, the docking activator includes a surface, a protrusion, a tab or a magnet. In an embodiment of the fifth aspect, the docking structure is configured to close when the docking activator engages with it and is configured to open when the docking activator disengages from it. In an embodiment of the fifth aspect, the docking structure is configured to activate in response to pressure from the docking activator. In an embodiment of the fifth aspect, the docking structure is configured to activate in response to displacement from the docking activator.

In a sixth aspect, a removable insect trap cartridge is disclosed including: an enclosure defining the cartridge, the enclosure having an adhesive surface and a first opening, wherein the adhesive surface is at least partially contained within the enclosure and is configured to adhere to an insect, and a docking activator, the docking activator configured to engage a docking structure in a mounting portion.

Further objects, features, and advantages of the disclosure will be apparent from the following detailed description when taken in conjunction with the following drawings.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

To provide an overall understanding of the devices and methods described herein, certain illustrative embodiments will now be described. For the purpose of clarity and illustration, these devices and methods will be described with respect to insect traps used for indoor residential or commercial purposes. It will be understood by one of ordinary skill in the art that the devices and methods described herein may be adapted and modified as appropriate.

As described herein, an insect trap may include a light source, a removable enclosure with at least one opening, an adhesive surface at least partially within the enclosure, and optics to redirect light from the light source onto the adhesive trapping surface. The light source may include at least one light emitting diode (LED). The optics may be attached to the removable enclosure, and may be located at least partially within the enclosure. The optics may include optical enhancers such as a reflector, a lens and/or a diffuser. The insect trap may further include an insect attractant that emits sound or scent. The light source in the insect trap may deactivate when the removable enclosure is removed from the insect trap. The insect trap may further include rigid conductors protruding substantially perpendicularly and directly from a rear surface of the insect trap, wherein the conductors may be insertable into an electrical socket, whereby the insect trap may be mounted by inserting the electrical plug into an electrical socket. Alternately, the insect trap may include a battery power supply electrically coupled to the light source.

The insect trap may effectively attract and trap insects indoors and may be manufactured and sold at a lower cost than traditionally available insect traps. An insect trap with this example configuration may be smaller than competing indoor insect traps, and may be conveniently movable from one location to another. An insect trap with this example configuration may be easier to clean and maintain without contacting trapped insects.

Figure 1:
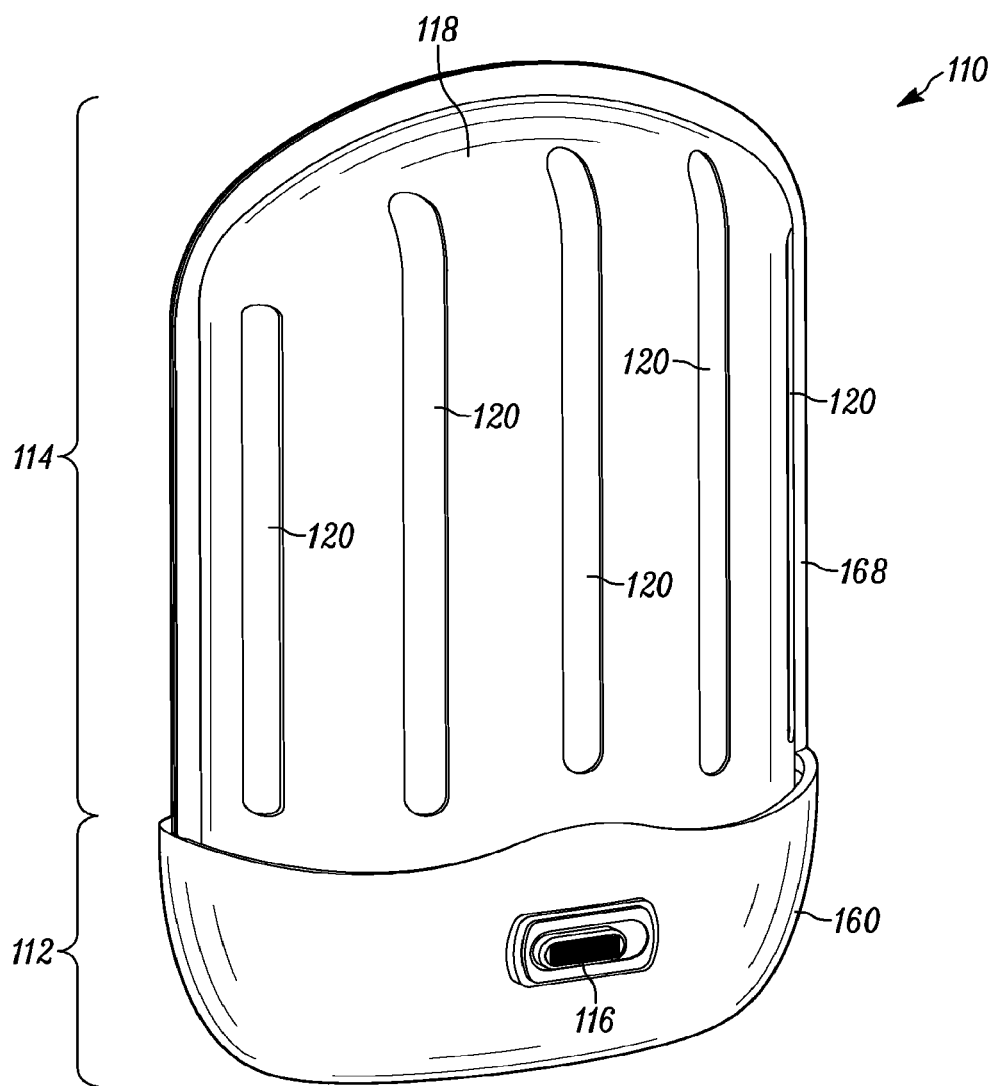
FIG. 1 is a front perspective view of a first embodiment of an insect trap in accordance with principles of the disclosure.

With reference to the drawings, FIG. 1 shows a front perspective view of a first embodiment of an insect trap, indicated generally at 110. The insect trap 110 includes a base portion 112 and a removable trap portion 114. A front surface 160 of base portion 112 may include a switch 116, configurable to enable the insect trap 110 to be turned on or off by closing or opening the switch 116 as desired by the user. Alternatively, switch 116 may be configured to control other features such as light intensity, combinations of light wavelengths, different modes or frequencies of flickering light, an automatic setting that turns on when the room gets dark, or a remote control setting, for example. Trap portion 114 includes a front housing 118 with at least one opening 120 in a front surface 168.

Figure 2:
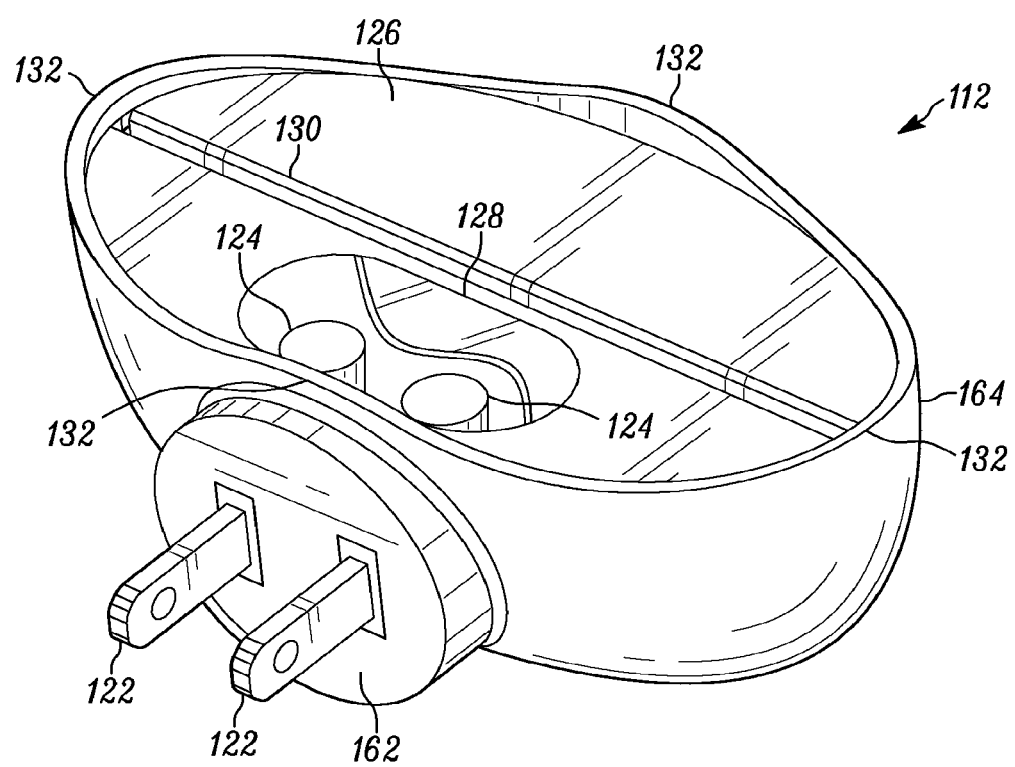
FIG. 2 is a rear perspective view of a base portion of the insect trap of FIG. 1 with a trap portion removed.

FIG. 2 shows a rear perspective view of base portion 112 of insect trap 110 with trap portion 114 removed. Protruding from a rear surface 162 of base portion 112 are two electrically conductive prongs 122, adapted to mount insect trap 110 to a wall and provide power to insect trap 110 by inserting prongs 122 into a standard household electrical wall socket. Alternatively, base portion 112 may be configured to sit or hang wherever desired and receive power from batteries (not shown) mounted in base portion 112. While an electrical socket and batteries have been described as providing power to trap 110, any suitable power source may be used. Base portion 112 includes a lighting element such as one or more light emitting diodes (LEDs) 124. In some embodiments, the LEDs 124 include one that emits ultraviolet (UV) light and one that emits visible light (e.g., blue light). In some embodiments, the lighting element emits a combination of wavelengths to mimic sunlight. Mounted in top surface 126 of base portion 112 may be a transparent or translucent window 128, shown partially cut away to reveal LEDs 124. Transparent or translucent window 128 protects the one or more LEDs 124 from dust and insect debris, and allows base portion 112 to be easily cleaned. In top surface 126 may be a slot 130, and on perimeter 164 of top surface 126 is a rim or upwardly directed protrusions 132.

Figure 3:
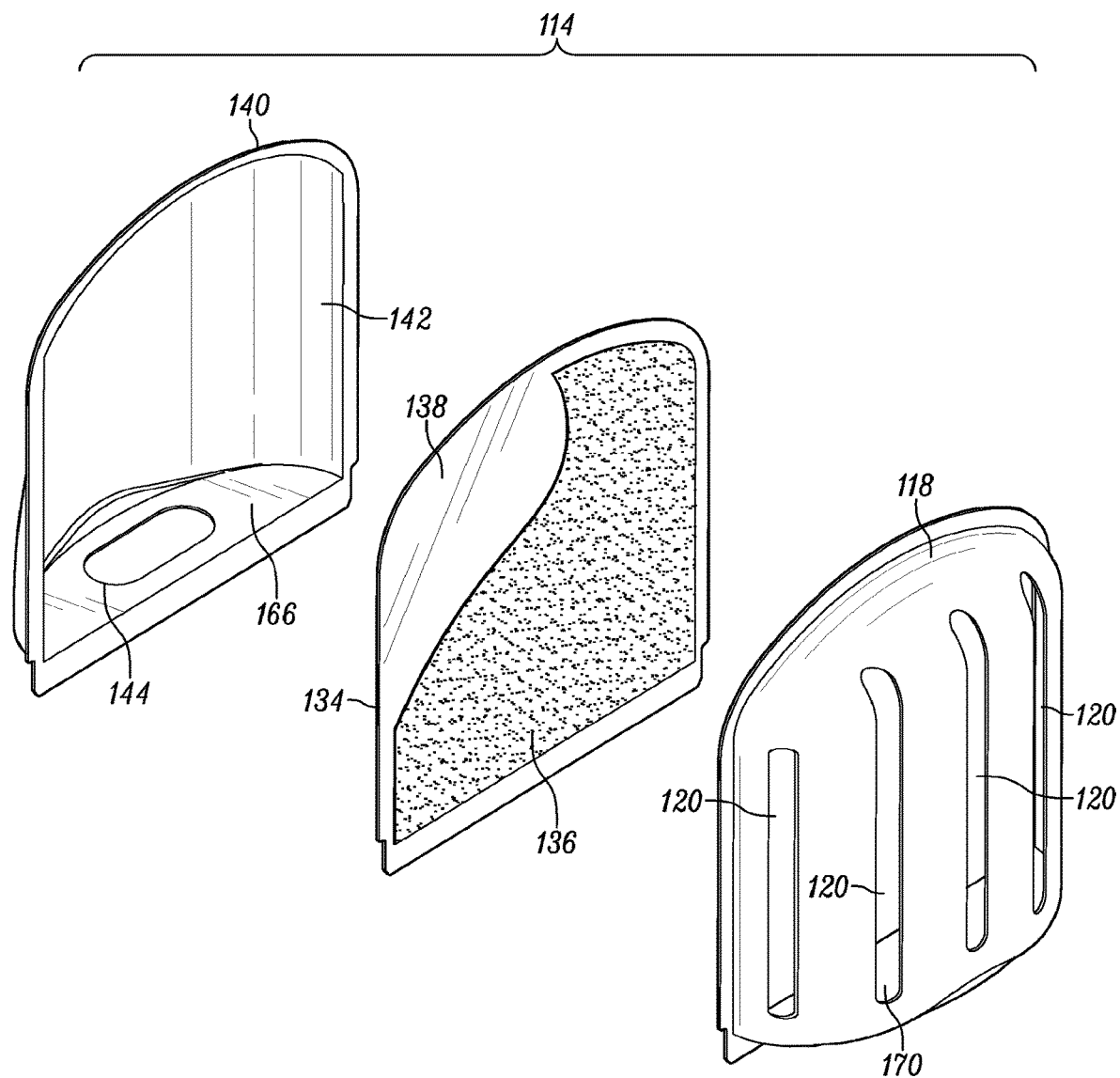
FIG. 3 is an exploded view of the trap portion of the insect trap of FIG. 1.

FIG. 3 shows an exploded view of trap portion 114 of insect trap 110. Trap portion 114 includes front housing 118 with at least one opening 120, a divider 134, and a rear housing 140. In some embodiments, divider 134 is constructed from or includes a transparent or translucent material and may be coated with a transparent or translucent adhesive 136 on a front surface 138. In some embodiments, the material and thickness of divider 134 and the material and thickness of adhesive 136 are selected to transmit a substantial proportion of the UV and visible light, for example greater than 60% of the light is transmitted through divider 134 and adhesive 136. In some embodiments, rear housing 140 includes a reflective-coated inside surface 142. Alternatively, the material and surface finish of rear housing 140 may be configured to reflect UV and/or visible light without a reflective coating. The rear housing 140 may include an opening 144 on its bottom surface 166, or alternatively opening 144 may be replaced by a transparent or translucent window (not shown).

Front housing 118 and rear housing 140 may be constructed from any suitable material, including a thermoformed opaque plastic material or other opaque, transparent or translucent materials such as paper, paperboard, cardboard or paper pulp. In some embodiments, front housing 118 and rear housing 140 are constructed by injection molding or by other suitable manufacturing techniques. As shown, divider 134 is substantially planar, although it may be formed into a convex, concave or saddle-shaped contour, or a combination of contours to optimize the even distribution of light. Alternatively, divider 134 may have ribs or other features that increase adhesive surface area and create regions of light/dark contrast, which are highly visible to a wide variety of insects and may be more attractive to them.

In some embodiments, front housing 118 may be coated with transparent, translucent or opaque adhesive on an inside surface 170 to provide additional insect trapping efficiency and capacity. In addition, front housing 118 may also have a reflective coating underneath the adhesive coating on inside surface 170 to enhance its attraction to insects and further improve the insect trapping efficiency and effectiveness.

In some embodiments, front housing 118, divider 134 and rear housing 140 are joined together at their perimeters with adhesive, although they may also be joined by other commonly used packaging assembly techniques such as ultrasonic welding or RF sealing, or any other suitable assembly method. The materials of trap portion 114 may also include insect attractants. For example, trap portion 114 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of the insect trap 110. In such embodiments, the insect attractant is integral to trap portion 114. Alternatively, the insect attractants may be embedded in a separate piece that mounts on inside surface 170 of front housing 118 or through an opening 120 in front housing 118 or on front surface 138 of divider 134. It is desirable for such attractants to be detectable by an insect for approximately a 2 meter radius from trap 110.

Figure 4:
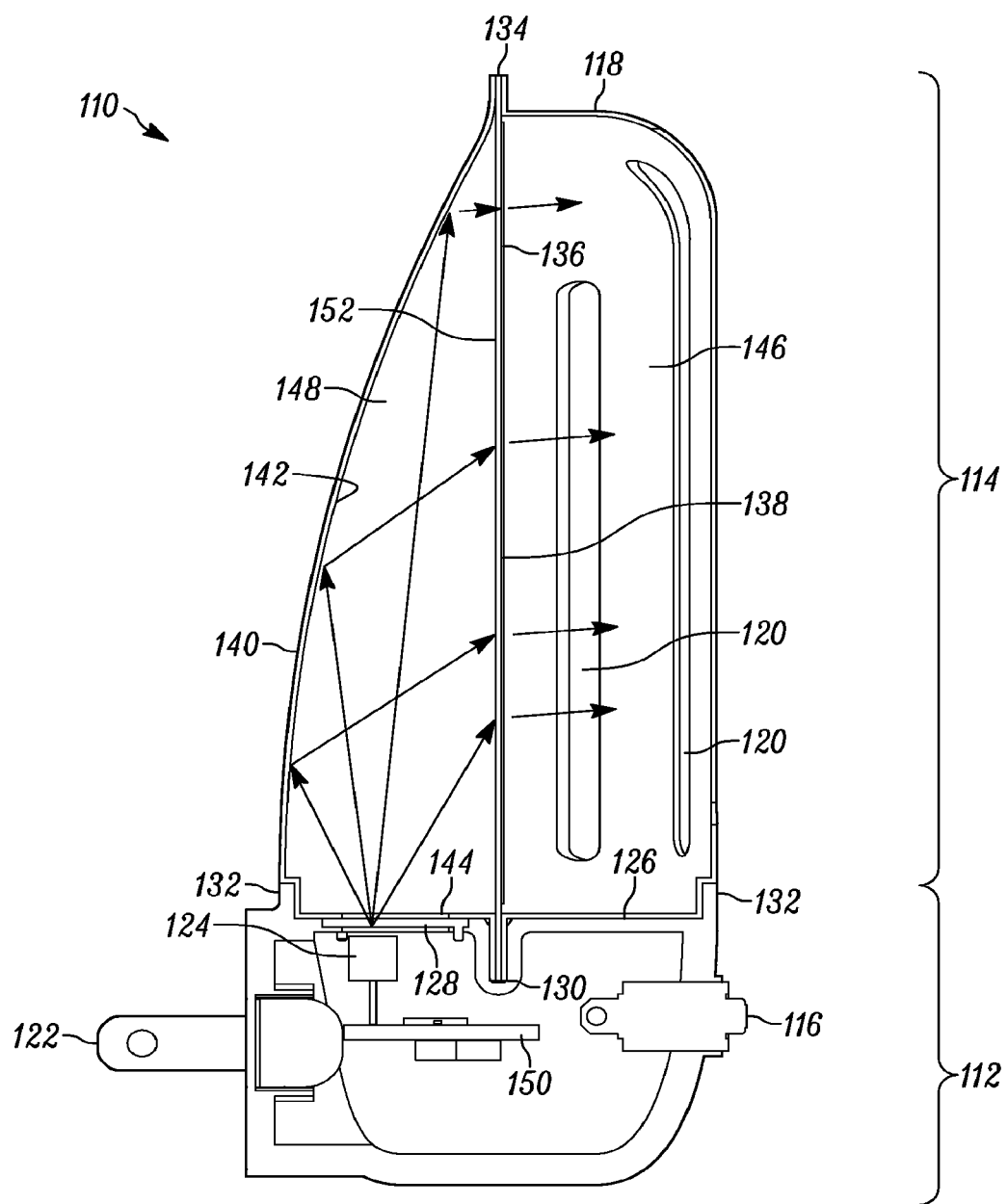
FIG. 4 is a cross-sectional view through the insect trap of FIG. 1.

FIG. 4 is a cross-sectional, cut-away view through insect trap 110 showing the interiors of base portion 112 and trap portion 114. As shown, divider 134 separates the trap portion 114 into a front enclosure 146 and a rear enclosure 148. In some embodiments, base portion 112 includes a circuit board 150 having a programmable processor or chip (not shown) for executing commands, electrically connected to conductive prongs 122, switch 116 and the one or more LEDs 124. For clarity, however, not all of the electrical connections are shown. The circuit board 150 may include electronic circuitry to receive ordinary household current from conductive prongs 122, respond to the position of switch 116 and provide power to illuminate the one or more LEDs 124. Circuit board 150 may include an energy stabilizer such as a full wave rectifier circuit or any other circuit that provides steady voltage to the one or more LEDs 124 when switch 116 is in the closed position, although it may also provide a varying voltage to the one or more LEDs 124 to provide a flickering light, which some species of insects find attractive. For example, light flickering frequencies in the approximate range of 0.05 Hz (e.g., to mimic the breathing rate of large mammals) to 250 Hz (e.g., the highest flicker frequency known to attract male houseflies), may be desirable and the lighting element may be configured to flicker within this range. Circuit board 150 may provide power to the one or more LEDs 124 to provide both UV and visible light, although it may be configured to provide power to only the one or more UV LEDs 124 or to only the one or more visible light LEDs 124, or to provide variable power to produce combinations of flickering UV and visible light. Circuit board 150 may also be configured to drive a transmitter or transceiver such as a piezoelectric speaker (not shown) or other device that may be mounted in the base portion 112 to emit an insect-attracting sound. For example, the transmitter or transceiver may emit an insect-attracting sound having a frequency in the range of approximately 0.5 Hz (e.g., the heart rate of large mammals) to 240 KHz (e.g., the highest frequency detectable by insects). In some embodiments, the frequency is in the range of approximately 5 Hz to 100 KHz. In some embodiments, the frequency is in the range of approximately 35 Hz to 50 Khz. It is desirable for such insect-attracting sound to be detectable by an insect for approximately a 2 meter radius from trap 110. It is desirable for such insect-attracting sound to be undetectable by a human beyond approximately a 1 meter radius from trap 110.

As shown, slot 130 in top surface 126 of base portion 112 and protrusions 132 on top surface 126 of base portion 112 engage with trap portion 114 to secure it in place during use, although any other form of attachment may be substituted that allows trap portion 114 to be securely but removably mounted to base portion 112.

In the operation of insect trap insect trap 110, conductive prongs 122 are inserted into a wall electrical socket, and switch 116 may be moved to a closed position. The one or more LEDs 124 emit light, represented by arrows, preferably UV and visible light, which is transmitted through window 128 in base portion 112, through opening 144 in rear housing 140 of trap portion 114, into rear enclosure 148, and directly onto reflective-coated inside surface 142 of rear housing 140 and a rear surface 152 of divider 134. In some embodiments, light is not manipulated in base portion 112 and is emitted directly into trap portion 114. Reflective-coated inside surface 142 of rear housing 140 may include a concave shape and may be configured to reflect the UV and visible light from the one or more LEDs 124 to distribute the light evenly onto rear surface 152 of the divider 134, although the shape of the inside surface 142 of the rear housing 140 may have a convex shape or a saddle shape or a combination of shapes, or may also have ribs or other features to more evenly distribute the light.

Alternatively, an optical enhancer such as an anamorphic lens (not shown) or any other lens or combination of lenses configured to distribute the UV and visible light (e.g., evenly, according to specific patterns, at a focal point, etc.) onto rear surface 152 of divider 134, may be mounted to the rear housing 140 at or near opening 144, and may replace or augment the role of the reflective-coated inside surface 142 of rear housing 140. In some embodiments, the UV and visible light from the one or more LEDs 124 may directly strike rear surface 152 of divider 134 at an oblique angle (e.g., an acute angle from approximately 0° to 90°) and be spread across divider 134, and may replace or augment the role of reflective-coated inside surface 142 of rear housing 140 or of the lens or lenses mounted to rear housing 140.

Thereafter, light may transmit through divider 134 and adhesive coating 136 on its front surface 138, and into front enclosure 146. Light may be further evenly distributed by the light-diffusing properties of divider 134, adhesive coating 136 on its front surface 138, or both. A portion of the light entering front enclosure 146 continues through one or more openings 120 in front housing 118 and is emitted into the surrounding area where the trap is installed. Insects may be attracted to the UV and/or visible light emitted through adhesive coating 136 and one or more openings 120 in the front housing 118, and fly or crawl into the one or more openings 120 and onto the adhesive coating 136, where they become trapped in adhesive (e.g., from adhesive coating 136). A user may observe trapped insects by looking through one or more openings 120 in front housing 118. When a sufficient number of insects have been trapped, the user may easily remove and discard the entire used trap portion 114 without touching the trapped insects, insect debris or adhesive, which remain out of reach inside trap portion 114, and replace it with a new trap portion 114. The new trap portion 114 may have fresh adhesive-coated surfaces and light-directing surfaces, ensuring that insect trap 110 will continue to efficiently and effectively attract and trap insects.

It should be appreciated that a benefit of trap 110 is the manipulation of light within trap portion 114. In some embodiments, light manipulation occurs solely within trap portion 114. Light manipulation may include reflection, refraction, polarization and/or diffusion and is achieved by engaging with a manipulative element or surface (e.g., inside surface 142, divider 134 and adhesive coating 136). In some embodiments, light manipulation produces an even distribution of light on an adhesive surface or adhesive coating 136. In some embodiments, light is manipulated to produce a predetermined pattern on the adhesive coating 136 or within trap portion 114, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 110 of this configuration may accommodate a variety of different trap portions 114 that may be removably mounted to base portion 112, each trap portion 114 being uniquely configured to attract and trap a specific species or multiple species of flying insect. For example, the overall size and shape of trap portion 114, and the size, shape, and orientation of the openings 120 in the front housing 118 of the trap portion 114, may be uniquely configured to attract and trap a specific species or multiple species of flying insect. For example, in some embodiments, trap portion 114 is approximately 20 mm to 600 mm wide, 20 mm to 600 mm high and 5 mm to 150 mm deep. In some embodiments, trap portion 114 is approximately 20 mm to 200 mm wide, 20 mm to 200 mm high and 5 mm to 80 mm deep. In some embodiments, trap portion 114 is approximately 20 mm to 130 mm wide, 20 mm to 130 mm high and 5 mm to 50 mm deep.

In some embodiments, base portion 112 is approximately 20 mm to 600 mm wide, 10 mm to 150 mm high and 10 mm to 150 mm deep. In some embodiments, base portion 112 is 20 mm to 200 mm wide, 10 mm to 100 mm high and 10 mm to 80 mm deep. In some embodiments, base portion 112 is 20 mm to 130 mm wide, 10 mm to 50 mm high and 10 mm to 50 mm deep.

As provided herein, openings 120 may be a variety of shapes and/or sizes. For example, openings 120 may be circular, square, rectangular, polygonal and/or elliptical in shape. Alternatively, openings 120 may be slots having straight, curved or undulating shapes or patterns. When openings 120 are circular, openings 120 may be approximately 0.5 mm to 30 mm in diameter. In some embodiments, circular openings 120 are approximately 0.5 mm to 20 mm in diameter. In some embodiments, circular openings 120 are approximately 0.5 mm to 15 mm in diameter. When openings 120 are slot shaped, openings 120 may be approximately 2 mm to 30 mm wide and 5 mm to 500 mm long. In some embodiments, slot openings 120 are approximately 2 mm to 20 mm wide and 5 mm to 200 mm long. In some embodiments, slot openings 120 are approximately 2 mm to 15 mm wide and 5 mm to 100 mm long.

In some embodiments, openings 120 cover all or a portion of trap portion 114. For example, openings 120 may cover a range of approximately 1% to 75% of the surface area of trap portion 114. In some embodiments, openings 120 cover approximately 5% to 50% of the surface area of trap portion 114. In some embodiments, openings 120 cover approximately 10% to 30% of the surface area of trap portion 114.

Figure 5:
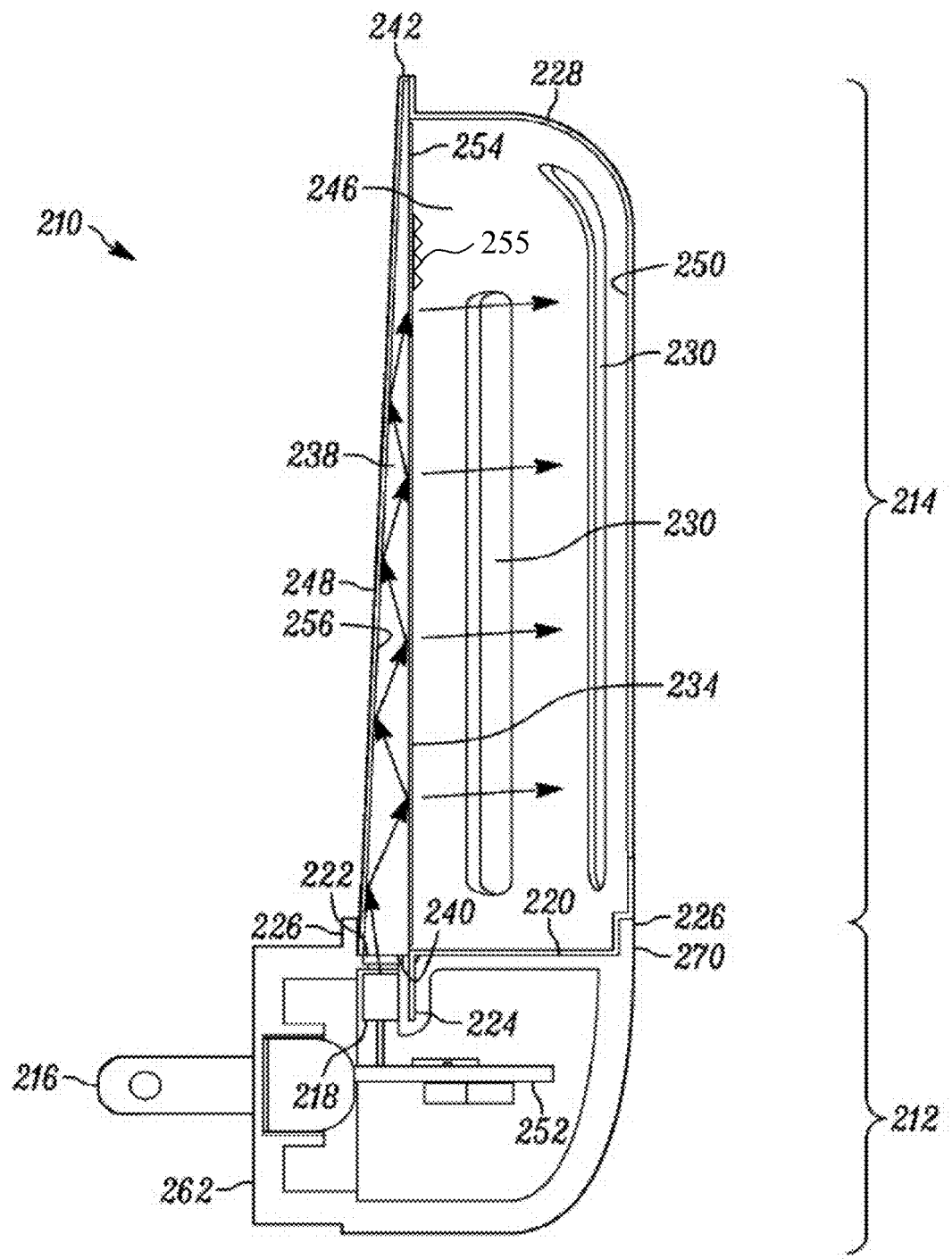
FIG. 5 is a cross-sectional view through a second embodiment of an insect trap in accordance with principles of the disclosure.

FIG. 5 shows a cross-sectional view of a second embodiment of an insect trap, indicated generally at 210. Insect trap 210 includes a base portion 212 and a removable trap portion 214. Protruding from a rear surface 262 of base portion 212 are two electrically conductive prongs 216, only one of which is shown, adapted to mount insect trap 210 to a wall and provide power to insect trap 210 by inserting prongs 216 into a standard household electrical wall socket. Alternatively, base portion 212 may be configured to sit or hang wherever desired and receive power from batteries (not shown) mounted in base portion 212. While an electrical socket and batteries have been described as providing power to trap 210, any suitable power source may be used. Base portion 212 includes a lighting element such as one or more LEDs 218. In some embodiments, LEDs 218 include one that emits ultraviolet (UV) light and one that emits visible light (e.g., blue light). In some embodiments, the lighting element emits a combination of wavelengths to mimic sunlight.

In some embodiments, mounted in a top surface 220 of base portion 212 is a transparent or translucent window 222, shown partially cut away to reveal LEDs 218. Transparent or translucent window 222 protects the one or more LEDs 218 from dust and insect debris, and allows base portion 212 to be easily cleaned. Top surface 220 of base portion 212 may include a slot 224, and on perimeter 270 of top surface 220 are upwardly directed protrusions 226.

Trap portion 214 includes a front housing 228 with at least one opening 230 and a light-conducting body 238. In some embodiments, light-conducting body 238 includes a front surface 254, an adhesive coating or an adhesive layer 234 on the front surface 254, and a rear cover 248. In some embodiments, the material and thickness of adhesive layer 234 are selected to transmit a substantial proportion of the UV and visible light, for example greater than 60% of the light is transmitted through adhesive layer 234. Light-conducting body may be tapered and configured to receive light through its bottom surface 240 from the one or more LEDs 218 and deflect and evenly distribute the light (e.g., through front surface 254 and adhesive layer 234). Rear cover 248 may be configured to prevent light from escaping through the back, top and side surfaces of light-conducting body 238. As provided herein, any suitable light-conducting body may be used.

Front housing 228 may be constructed from any suitable material, including a thermoformed opaque plastic material or other opaque, transparent or translucent materials such as paper, paperboard, cardboard or paper pulp. In some embodiments, front housing 228 is constructed by injection molding or by other suitable manufacturing techniques.

The front housing 228 may also be coated with transparent, translucent or opaque adhesive on an inside surface (not shown) to provide additional insect trapping efficiency and capacity. In addition, the front housing 228 may also have a reflective coating underneath the adhesive coating on its inside surface to enhance its attraction to insects and further improve the insect trapping efficiency and effectiveness. Front housing 228 and light-conducting body 238 may be joined together at their perimeters with adhesive, although they may also be joined by other commonly used packaging assembly techniques such as ultrasonic welding or RF sealing, or any other suitable assembly method.

As shown, front housing 228 and light-conducting body 238 together form a front enclosure 246. Light-conducting body 238 may be tapered (e.g., thicker at a bottom surface 240 and thinner at a top surface 242), and may be constructed from any transparent material that conducts UV and/or visible light, such as acrylic or polycarbonate plastic. The inside surfaces (not shown) of rear cover 248 may have a reflective coating to reflect light back into light-conducting body 238 and through its front surface 254, thereby increasing its light-transmitting efficiency. Light-conducting body 238 may also have facets 255 or other features of varying size, depth, and density on front surface 254 to enhance its light-transmitting efficiency.

Alternatively, in some embodiments, light-conducting body 238 has facets 255 or other features on its front surface 254 and is not tapered. Light-conducting body 238 with microscopic facets 255 or other features on its front surface 254 is commonly referred to as a Light Guide Plate, although the facets 255 or other features may also be larger and still function effectively.

Alternatively, in some embodiments, light-conducting body 238 may not have an adhesive coating, and light conducting body 238 and rear cover 248 may be part of the base portion 212. In such embodiments, trap portion 214 may include a transparent or translucent back plate (not shown) with an adhesive coating on its front surface, attached at its perimeter to the front housing 228.

The materials of the trap portion 214 may also include insect attractants. For example, trap portion 214 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of the insect trap. In such embodiments, the insect attractant is integral to trap portion 214. Alternatively, the insect attractants may be embedded in a separate piece that mounts on an inside surface 250 of front housing 228 or through the at least one opening 230 in front housing 228 or on front surface 254 of light-conducting body 238. It is desirable for such attractants to be detectable by an insect for approximately a 2 meter radius from trap 210.

In some embodiments, base portion 212 includes a circuit board 252 having a programmable processor or chip (not shown) for executing commands, electrically connected to the conductive prongs 216 and one or more LEDs 218. For clarity, however, not all of the electrical connections are shown. Circuit board 252 may include electronic circuitry to receive ordinary household current from conductive prongs 216 and provide power to illuminate the one or more LEDs 218. Circuit board 252 may include an energy stabilizer such as a full wave rectifier circuit or any other circuit that provides steady voltage to one or more LEDs 218, although it may also provide a varying voltage to the one or more LEDs 218 to provide a flickering light, which some species of insects find attractive. For example, light flickering frequencies in the approximate range from 0.05 Hz (e.g., to mimic the breathing rate of large mammals), to 270 Hz (e.g., the highest flicker frequency known to attract male houseflies), may be desirable and the lighting element may be configured to flicker within this range. Circuit board 252 may provide power to the one or more LEDs 218 to provide both UV and visible light although it may be configured to provide power to only the one or more UV LEDs 218 or to only the one or more visible light LEDs 218, or to provide variable power to produce combinations of flickering UV and visible light. Circuit board 252 may also be configured to drive a transmitter or transceiver such as a piezoelectric speaker or other device that may be mounted in base portion 212 to emit an insect-attracting sound. For example, the transmitter or transceiver may emit an insect-attracting sound having a frequency in the range of approximately 0.5 Hz (e.g., the heart rate of large mammals), to 240 KHz (e.g., the highest frequency detectable by insects). In some embodiments, the frequency is in the range of approximately 5 Hz to 100 KHz. In some embodiments, the frequency is in the range of approximately 35 Hz to 50 Khz. It is desirable for such insect-attracting sound to be detectable by an insect for approximately a 2 meter radius from trap 210. It is desirable for such insect-attracting sound to be undetectable by a human beyond approximately a 1 meter radius from trap 210.

As shown, slot 224 in top surface 220 of base portion 212 and protrusions 226 on top surface 220 of base portion 212 engage with trap portion 214 to secure it in place during use, although any other form of attachment may be substituted that allows trap portion 214 to be securely but removably mounted on base portion 212.

In the operation of insect trap 210, conductive prongs 216 are inserted into a wall electrical socket, and one or more LEDs 218 emit light, represented by arrows, preferably UV and visible light. The light from one or more LEDs 218 may transmit through window 222, enter the thicker bottom surface 240 of tapered light-conducting body 238 and repeatedly reflect off of its front surface 254 and its rear surface 256. In some embodiments, light is not manipulated in base portion 212 and is emitted directly into trap portion 214. A portion of the reflected light may transmit through front surface 254 of the light-conducting body 238 to provide an evenly-distributed light onto and through adhesive coating 234 and into front enclosure 246. The light may be further evenly distributed by refractive and light-diffusing properties of adhesive coating 234 on front surface 254 of light-conducting body 238. A portion of the light entering the front enclosure 246 continues through one or more openings 230 in front housing 228 and is emitted into the surrounding area where the trap 210 is installed. Insects may be attracted to the UV and/or visible light transmitted through adhesive coating 234 and through one or more openings 230 in the front housing 228, and fly or crawl into one or more openings 230 and onto the adhesive coating 234, where they become trapped in the adhesive. The user may observe trapped insects by looking through one or more openings 230 in front housing 228. When a sufficient number of insects have been trapped, the user may easily remove and discard the entire used trap portion 214 without touching the trapped insects, insect debris or adhesive, which remain out of reach inside trap portion 114, and replace it with a new trap portion 214. The new trap portion 214 may have fresh adhesive-coated surfaces and light-directing surfaces, ensuring that the insect trap 210 will continue to efficiently and effectively attract and trap insects.

It should be appreciated that a benefit of trap 210 is the manipulation of light within trap portion 214. In some embodiments, light manipulation occurs solely within trap portion 214. Light manipulation may include reflection, refraction, polarization and/or diffusion and is achieved by engaging with a manipulative element or surface (e.g., light-conducting body 238, front surface 254 and rear surface 256, and adhesive coating 234). In some embodiments, light manipulation produces an even distribution of light on an adhesive surface or adhesive coating 234. In some embodiments, light is manipulated to produce a predetermined pattern on the adhesive coating 234 or within trap portion 214, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 210 of this configuration may accommodate a variety of different trap portions 214 that may be removably mounted to base portion 212, each trap portion 214 being uniquely configured to attract and trap a specific species or multiple species of insects. For example, the overall size and shape of trap portion 214, and the size, shape, and orientation of the openings 230 in front housing 228 of trap portion 214, may be uniquely configured to attract and trap a specific species or multiple species of insects. For example, in some embodiments, trap portion 214 is approximately 20 mm to 600 mm wide, 20 mm to 600 mm high and 5 mm to 150 mm deep. In some embodiments, trap portion 214 is approximately 20 mm to 200 mm wide, 20 mm to 200 mm high and 5 mm to 80 mm deep. In some embodiments, trap portion 214 is approximately 20 mm to 130 mm wide, 20 mm to 130 mm high and 5 mm to 50 mm deep.

In some embodiments, base portion 212 is approximately 20 mm to 600 mm wide, 10 mm to 150 mm high and 10 mm to 150 mm deep. In some embodiments, base portion 212 is 20 mm to 200 mm wide, 10 mm to 100 mm high and 10 mm to 80 mm deep. In some embodiments, base portion 212 is 20 mm to 130 mm wide, 10 mm to 50 mm high and 10 mm to 50 mm deep.

As provided herein, openings 230 may be a variety of shapes and/or sizes. For example, openings 230 may be circular, square, rectangular, polygonal and/or elliptical in shape. Alternatively, openings 230 may be slots having straight, curved or undulating shapes or patterns. When openings 230 are circular, openings 230 may be approximately 0.5 mm to 30 mm in diameter. In some embodiments, circular openings 230 are approximately 0.5 mm to 20 mm in diameter. In some embodiments, circular openings 230 are approximately 0.5 mm to 15 mm in diameter. When openings 230 are slot shaped, openings 230 may be approximately 2 mm to 30 mm wide and 5 mm to 500 mm long. In some embodiments, slot openings 230 are approximately 2 mm to 20 mm wide and 5 mm to 200 mm long. In some embodiments, slot openings 230 are approximately 2 mm to 15 mm wide and 5 mm to 100 mm long.

In some embodiments, openings 230 cover all or a portion of trap portion 214. For example, openings 230 may cover a range of approximately 1% to 75% of the surface area of trap portion 214. In some embodiments, openings 230 cover approximately 5% to 50% of the surface area of trap portion 214. In some embodiments, openings 230 cover approximately 10% to 30% of the surface area of trap portion 214.

Figure 6:
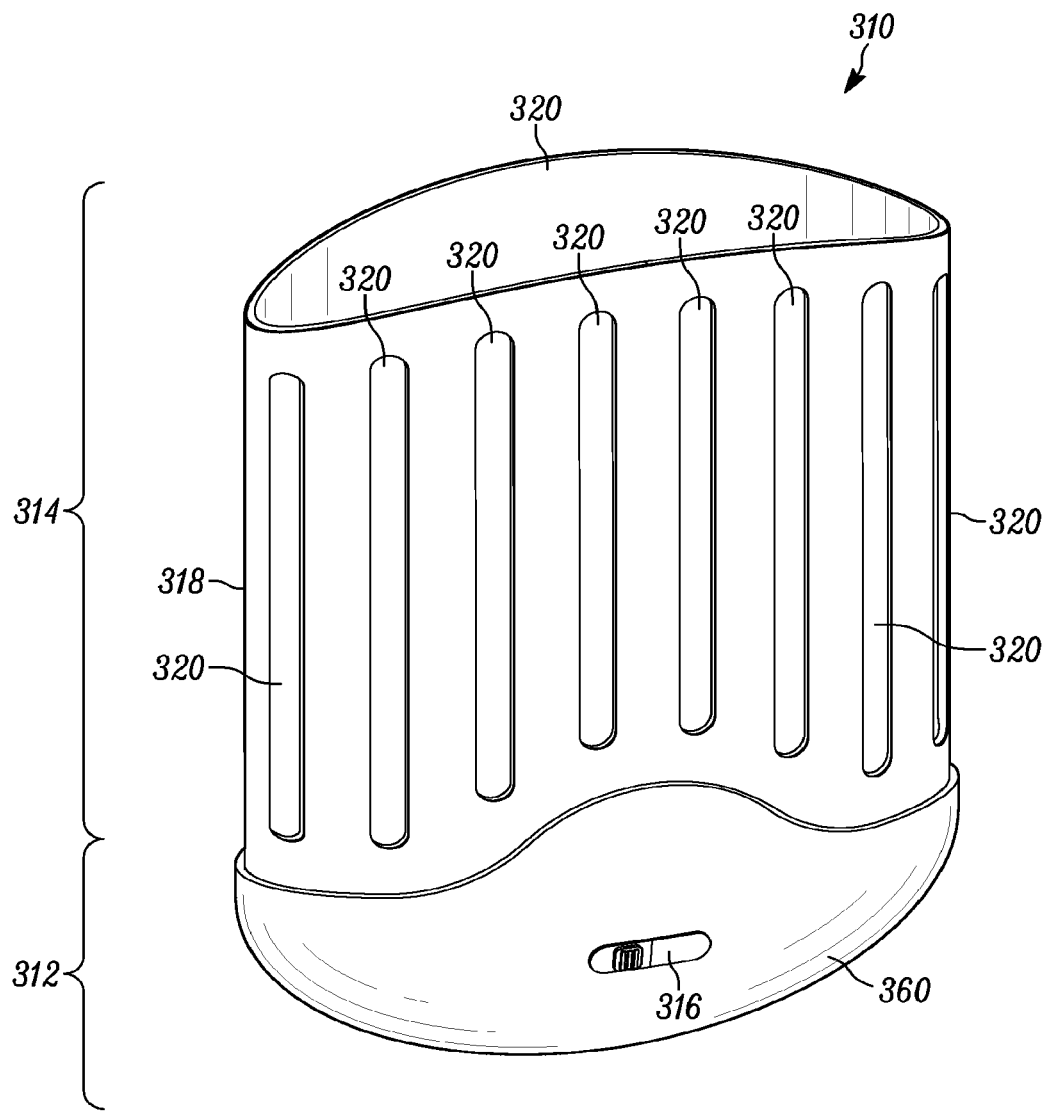
FIG. 6 is a front perspective view of a third embodiment of an insect trap in accordance with principles of the disclosure.

FIG. 6 shows a front perspective view of a third embodiment of an insect trap, indicated generally at 310. Insect trap 310 includes a base portion 312 and a removable trap portion 314. In some embodiments, front surface 360 of base portion 312 includes a switch 316, configurable to enable insect trap 310 to be turned on or off by closing or opening switch 316, as desired by the user. Alternatively, switch 316 may be configured to control other features such as light intensity, combinations of light wavelengths, different flickering frequencies or modes, an automatic setting that turns on when the room gets dark, or a remote control setting, for example. Trap portion 314 includes a housing 318 with at least one opening 320.

Figure 7:
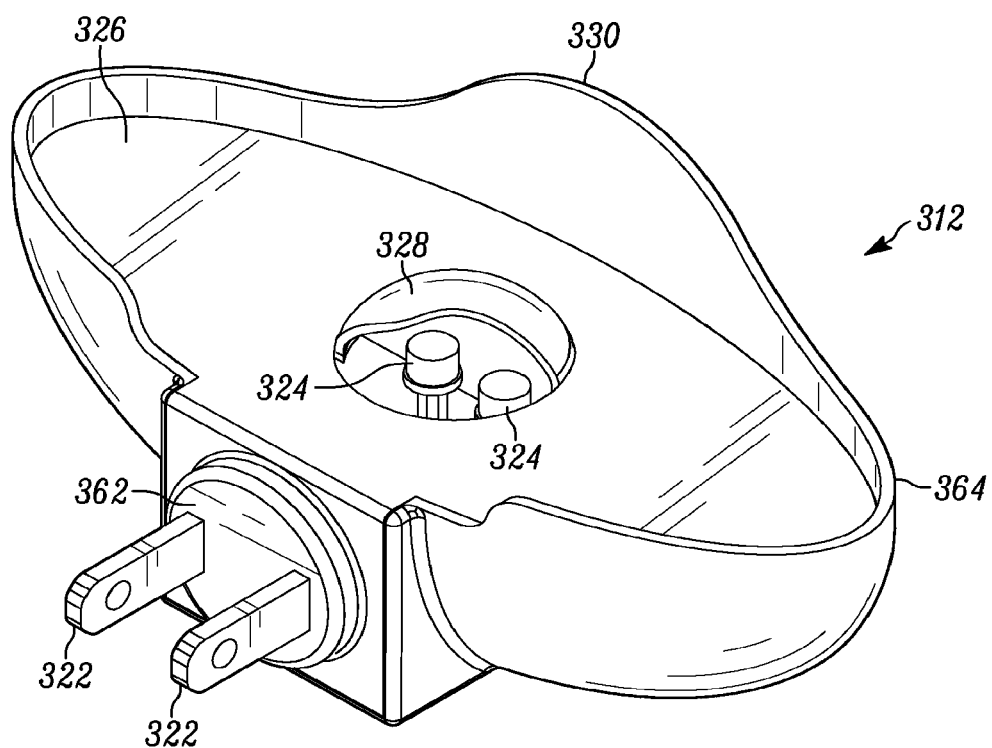
FIG. 7 is a rear perspective view of a base portion of the insect trap of FIG. 6 with a trap portion removed.

FIG. 7 shows a rear perspective view of base portion 312 of insect trap 310 with trap portion 314 removed. Protruding from a rear surface 362 of base portion 312 are two electrically conductive prongs 322, adapted to mount insect trap 310 to a wall and provide power to insect trap 310 by inserting into a standard household electrical wall socket. Alternatively, base portion 312 may be configured to sit or hang wherever desired and receive power from batteries (not shown) mounted in base portion 312. While an electrical socket and batteries have been described as providing power to trap 310, any suitable power source may be used. Base portion 312 includes a lighting element such as one or more LEDs 324. In some embodiments, the LEDs 324 include one that emits ultraviolet (UV) light and one that emits visible light (e.g., blue light). In some embodiments, the lighting element emits a combination of wavelengths to mimic sunlight. Mounted in top surface 326 of base portion 312 may be a transparent or translucent window 328, shown partially cut away to reveal LEDs 324. Transparent or translucent window 328 protects the one or more LEDs 324 from dust and insect debris, and allows base portion 312 to be easily cleaned. Upwardly directed protrusions or a rim 330 protruding from perimeter 364 of top surface 326 of base portion 312 may serve to secure trap portion 314 in place during use, although any other form of attachment may be substituted that allows trap portion 314 to be securely but removably mounted to base portion 312.

Figure 8:
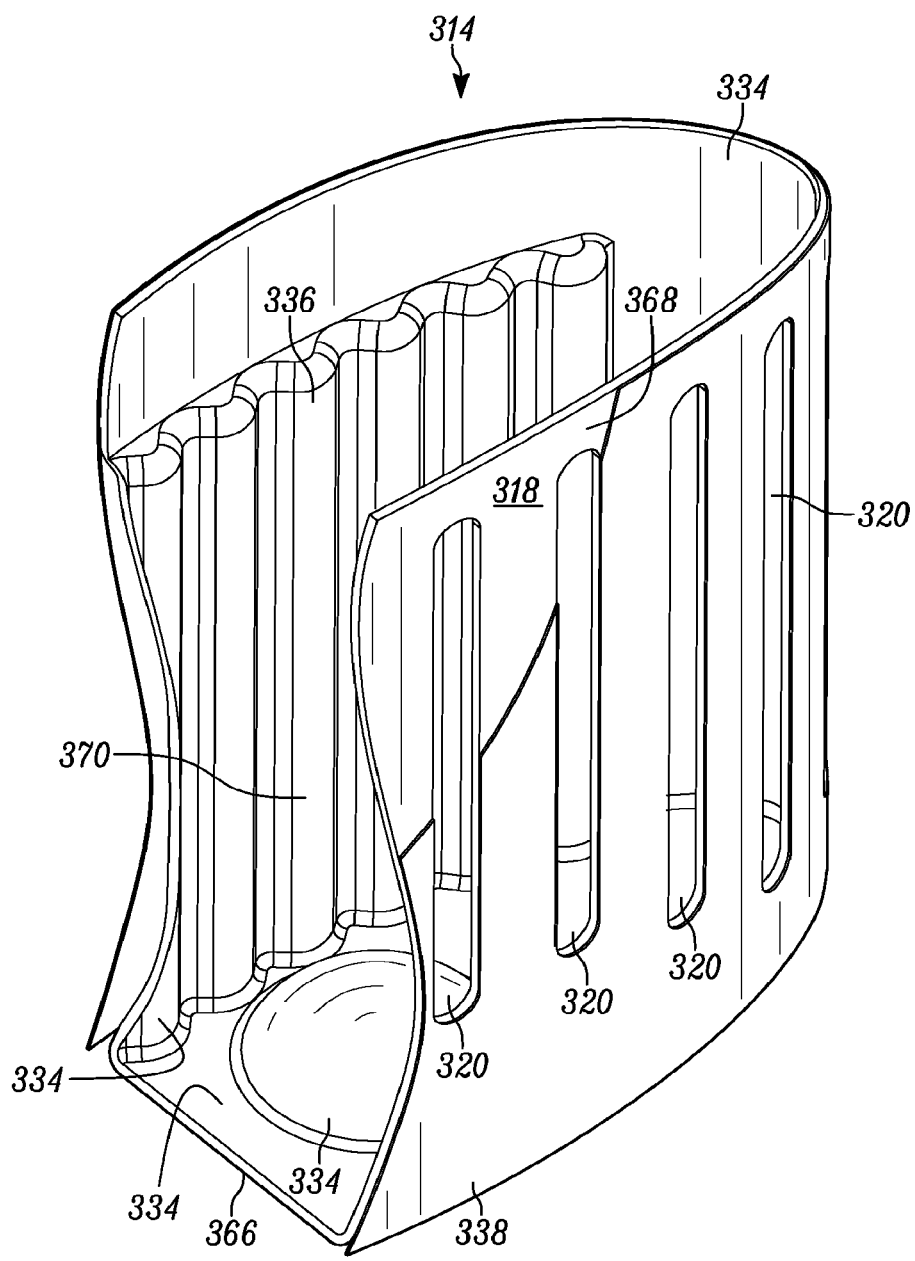
FIG. 8 is a perspective view, partly broken away, of the trap portion of the insect trap of FIG. 6.

FIG. 8 shows a perspective view, partly broken away, of trap portion 314 of insect trap 310. Trap portion 314 includes housing 318, which forms an enclosure with one or more openings 320, and a transparent or translucent adhesive coating applied to one or more inside surface 334. In some embodiments, the material and thickness of housing 318 and the material and thickness of the adhesive coating are selected to transmit a substantial proportion of the UV and visible light, for example greater than 60% of the light is transmitted through housing 318 and the adhesive coating. Housing 318 may be constructed from any suitable material, including a thermoformed opaque plastic material or other opaque, transparent or translucent materials such as paper, paperboard, cardboard or paper pulp. In some embodiments, housing 318 is constructed by injection molding or by other suitable manufacturing techniques.

As shown, housing 318 includes ribs 336 or other features that increase the adhesive-coated surface area, produce alternating light/dark regions that some insect species find attractive, and enhance the transmission of insect-attracting light into interior 370 of trap portion 314. A sleeve 338, configured to reduce the amount of light emitted by outside surface 368 of housing 318, covers outside surface 368 of housing 318 except for a bottom surface 366 and at one or more openings 320. Sleeve 338 may be constructed from any suitable material, including a thermoformed opaque plastic material or other opaque, transparent or translucent materials such as paper, paperboard, cardboard or paper pulp. In some embodiments, sleeve 338 includes a reflective coating on one or more of its inside surfaces, allowing sleeve 338 to direct more light through adhesive-coated inside surfaces 334 of housing 318 and further enhance the insect attracting and trapping efficiency and effectiveness. In some embodiments, sleeve 338 is replaced by a coating configured to reduce the amount of light emitted by outside surface 368 of housing 318, or by the coating applied over a reflective coating, applied to outside surface 368 of housing 318, except for bottom surface 366.

The materials of the trap portion 314 may also include insect attractants. For example, trap portion 314 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that increases the insect-attracting efficiency of the insect trap. In such embodiments, the insect attractant is integral to trap portion 314. Alternatively, the insect attractants may be embedded in a separate piece that mounts on inside surface 334 of housing 318 or through opening 320 in housing 318. It is desirable for such attractants to be detectable by an insect for approximately a 2 meter radius from trap 310.

Figure 9:
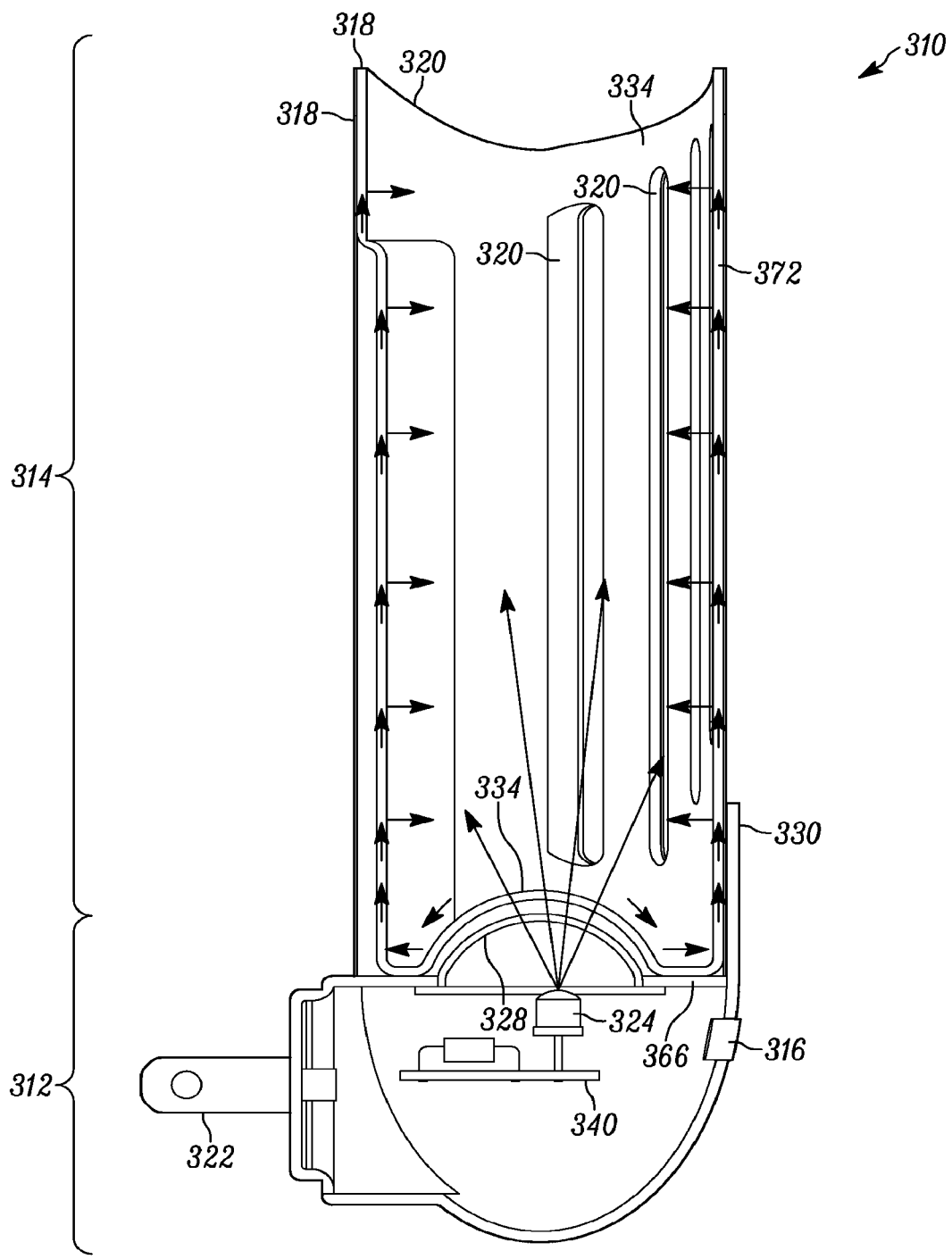
FIG. 9 is a cross-sectional view through the insect trap of FIG. 6 showing the interior of the base portion and the trap portion.

FIG. 9 is a cross-sectional view through insect trap 310 showing the interiors of base portion 312 and trap portion 314. In some embodiments, base portion 312 includes a circuit board 340 having a programmable processor or chip (not shown) for executing commands, electrically connected to conductive prongs 322, only one of which is shown, switch 316 and the one or more LEDs 324. For clarity, however, not all of the electrical connections are shown. Circuit board 340 may include electronic circuitry to receive ordinary household current from the conductive prongs 322, respond to the position of switch 316 and provide power to illuminate the one or more LEDs 324. Circuit board 340 may include an energy stabilizer such as a full wave rectifier filter circuit or any other circuit that provides steady voltage to one or more LEDs 324 when switch 316 is in a closed position, although it may also provide a varying voltage to one or more LEDs 324 to provide a flickering light, which some species of insect find attractive. For example, light flickering frequencies in the approximate range of 0.05 Hz (e.g., to mimic the breathing rate of mammals) to 250 Hz (e.g., the highest flicker frequency known to attract male houseflies), may be desirable and the lighting element may be configured to flicker within this range. Circuit board 340 may provide power to one or more LEDs 324 to provide both UV and visible light, although it could be configured to provide power to only one or more UV LEDs 324 or to only one or more visible light LEDs 324, or to provide variable power to produce combinations of flickering UV and visible light. In some embodiments, circuit board 340 may be configured to drive a transmitter or transceiver such as a piezoelectric speaker or other device that may be mounted in base portion 312 to emit an insect-attracting sound. For example, the transmitter or transceiver may emit an insect-attracting sound having a frequency in the range of approximately 0.5 Hz (e.g., the heart rate of large mammals) to 240 KHz (e.g., the highest frequency detectable by insects). In some embodiments, the frequency is in the range of approximately 5 Hz to 100 KHz. In some embodiments, the frequency is in the range of approximately 35 Hz to 50 Khz. It is desirable for such insect-attracting sound to be detectable by an insect for approximately a 2 meter radius from trap 310. It is desirable for such insect-attracting sound to be undetectable by a human beyond approximately a 1 meter radius from trap 310.

In the operation of insect trap 310, conductive prongs 322 are inserted into a wall electrical socket and switch 316 may be moved to a closed position. The one or more LEDs 324 emit light, represented by arrows, preferably UV and visible light, which transmit through at least one window 328 in base portion 312 and through bottom surface 366 of housing 318. In some embodiments, light is not manipulated in base portion 312 and is emitted directly into trap portion 314. A portion of the light continues within the enclosure, up one or more sides 372 of housing 318, and out through adhesive-coated inside surfaces 334. Another portion of the light continues through bottom surface 366 of housing 318 and into the enclosure, where it illuminates adhesive-coated inside surfaces 334. A portion of the light entering housing 318 continues through openings 320 and is emitted into the surrounding area where the trap is installed. Insects in the area are attracted to the UV and/or visible light transmitted through openings 320 and fly or crawl into openings 320 and onto adhesive coated inside surfaces 334, where they become stuck in the adhesive and are trapped. The user may observe trapped insects by looking through openings 320. When a sufficient number of insects have been trapped, the user may easily remove and discard the entire used trap portion 314 without touching trapped insects, insect debris or adhesive, which remain out of reach inside trap portion 314, and replace it with a new trap portion 314. The new trap portion 314 may have fresh adhesive-coated inside surfaces 334, housing 318 has a clean bottom surface 366 through which the UV and/or visible light is transmitted into trap portion 314, and the transparent or translucent material of trap portion 314 has not been degraded by prolonged exposure to UV light, thereby ensuring that insect trap 310 will continue to efficiently and effectively attract and trap insects.

It should be appreciated that a benefit of trap 310 is the manipulation of light within trap portion 314. In some embodiments, light manipulation occurs solely within trap portion 314. Light manipulation may include reflection, refraction, polarization and/or diffusion and is achieved by engaging with a manipulative element or surface (e.g., housing 318 and adhesive-coated inside surfaces 334). In some embodiments, light manipulation produces an even distribution of light on an adhesive surface or adhesive coating. In some embodiments, light is manipulated to produce a predetermined pattern on the adhesive coating or within trap portion 314, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 310 of this configuration may accommodate a variety of different trap portions 314 that may be removably mounted to base portion 312, each trap portion 314 being uniquely configured to attract and trap a specific species or multiple species of insects. For example, the overall size and shape of trap portion 314, and the size, shape, and orientation of openings 320 in housing 318 of the trap portion 314, may be uniquely configured to attract and trap a specific species or multiple species of insects. For example, in some embodiments, trap portion 314 is approximately 20 mm to 600 mm wide, 20 mm to 600 mm high and 5 mm to 150 mm deep. In some embodiments, trap portion 314 is approximately 20 mm to 200 mm wide, 20 mm to 200 mm high and 5 mm to 80 mm deep. In some embodiments, trap portion 314 is approximately 20 mm to 130 mm wide, 20 mm to 130 mm high and 5 mm to 50 mm deep.

In some embodiments, base portion 312 is approximately 20 mm to 600 mm wide, 10 mm to 150 mm high and 10 mm to 150 mm deep. In some embodiments, base portion 312 is 20 mm to 200 mm wide, 10 mm to 100 mm high and 10 mm to 80 mm deep. In some embodiments, base portion 312 is 20 mm to 130 mm wide, 10 mm to 50 mm high and 10 mm to 50 mm deep.

As provided herein, openings 320 may be a variety of shapes and/or sizes. For example, openings 320 may be circular, square, rectangular, polygonal and/or elliptical in shape. Alternatively, openings 320 may be slots having straight, curved or undulating shapes or patterns. When openings 320 are circular, openings 320 may be approximately 0.5 mm to 30 mm in diameter. In some embodiments, circular openings 320 are approximately 0.5 mm to 20 mm in diameter. In some embodiments, circular openings 320 are approximately 0.5 mm to 15 mm in diameter. When openings 320 are slot shaped, openings 320 may be approximately 2 mm to 30 mm wide and 5 mm to 500 mm long. In some embodiments, slot openings 320 are approximately 2 mm to 20 mm wide and 5 mm to 200 mm long. In some embodiments, slot openings 320 are approximately 2 mm to 15 mm wide and 5 mm to 100 mm long.

In some embodiments, openings 320 cover all or a portion of trap portion 314. For example, openings 320 may cover a range of approximately 1% to 75% of the surface area of trap portion 314. In some embodiments, openings 320 cover approximately 5% to 50% of the surface area of trap portion 314. In some embodiments, openings 320 cover approximately 10% to 30% of the surface area of trap portion 314.

Although as shown in the embodiments of FIGS. 1-9, the trap portion mounts on a top surface of the base portion, other configurations may also work effectively. For example, FIGS. 10 and 11 show a fourth embodiment of an insect trap, where the trap portion mounts to the front of the base portion.

Figure 10:
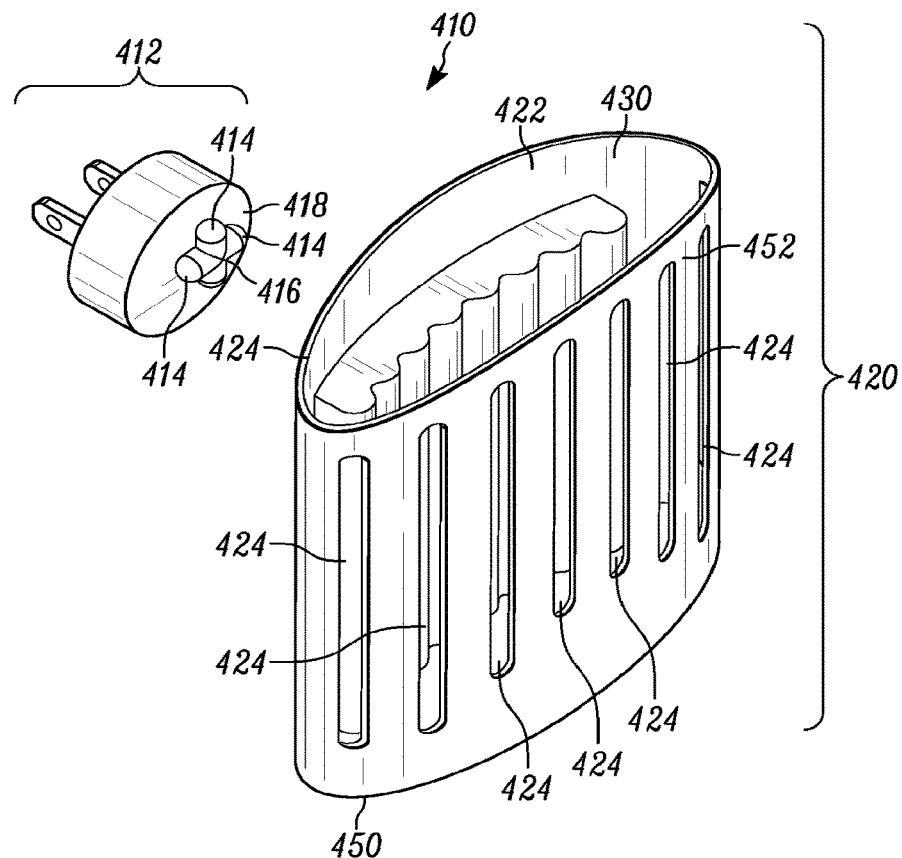
FIG. 10 is a front perspective view of a fourth embodiment of an insect trap in accordance with principles of the disclosure.
Figure 11:
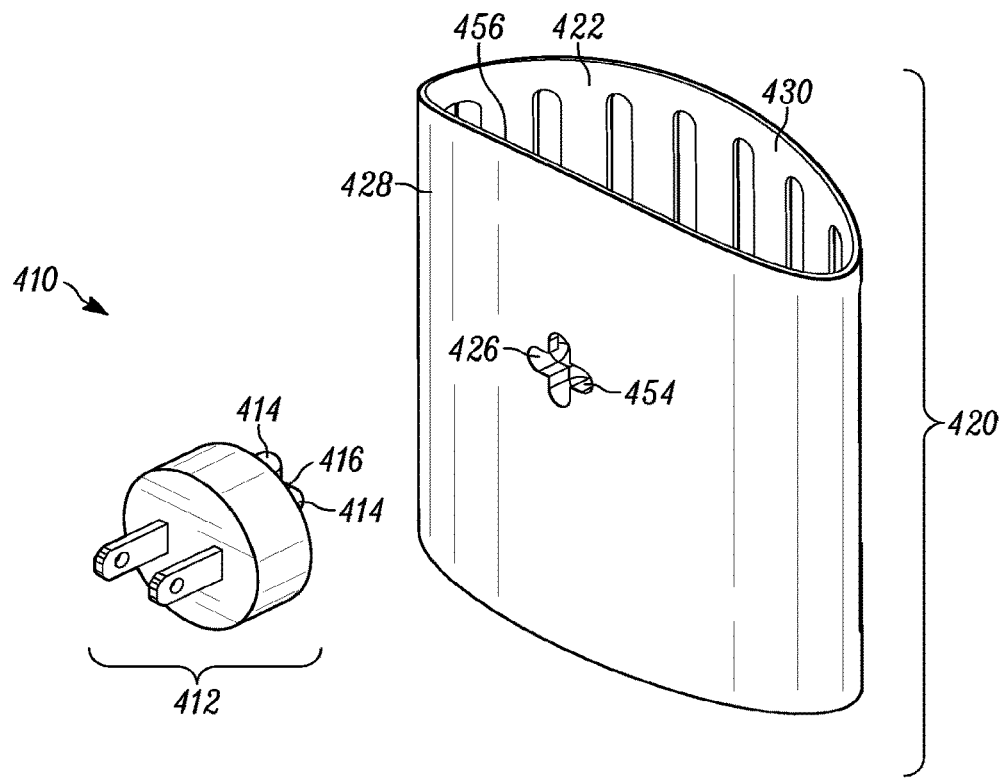
FIG. 11 is a rear perspective view of the insect trap of FIG. 10.

FIG. 10 is a front perspective view and FIG. 11 is a rear perspective view, both showing the fourth embodiment of an insect trap, indicated generally at 410. Base portion 412 mounts and is provided power by plugging into a household wall electrical socket. Alternatively, base portion 412 may be configured to sit or hang wherever desired and receive power from batteries (not shown) mounted in base portion 412. While an electrical socket and batteries have been described as providing power to trap 410, any suitable power source may be used. In some embodiments, base portion 412 includes a circuit board (not shown) having a programmable processor or chip (not shown) for executing commands.

A lighting element such as one or more LEDs 414 may be mounted on a cross-shaped protrusion 416 protruding from front surface 418 of base portion 412. Alternatively, LEDs 414 may form a protrusion themselves. While shown as a cross-shaped protrusion, the mounting surface and/or LED 414 configuration may be any desired shape. Trap portion 420 includes a housing 450 of translucent or transparent material with one or more adhesive-coated inside surfaces 422 and one or more openings 424. In some embodiments, the material and thickness of housing 450 and the material and thickness of the adhesive are selected to transmit a substantial proportion of the UV and visible light, for example greater than 60% of the light is transmitted through housing 450 and the adhesive coating. Trap portion 420 may include a coating configured to reduce the amount of light emitted by the one or more outside surfaces 452, on one or more outside surfaces 452 except for at the one or more openings 424 and at opening 426 in rear surface 428. As shown, opening 426 is a cross-shaped cavity 454, but may be any desired shape. For example, cross-shaped protrusion 416 on front surface 418 of base portion 412 may engage with a recess in cross-shaped cavity 454 in rear surface 428 of trap portion 420 to removably attach trap portion 420 to base portion 412. In this configuration, therefore, trap portion 414 mounts in front of base portion 412.

In the operation of insect trap 410, base portion 412 is plugged into an electrical wall socket and trap portion 420 is mounted in front of base portion 412. Light from one or more LEDs 414, in UV and/or visible light wavelengths, may transmit into cross-shaped cavity 454 in rear surface 428 of trap portion 420. In some embodiments, light is not manipulated in base portion 412 and is emitted directly into trap portion 414. A portion of the light may continue within the translucent or transparent walls of the trap portion 420, diffusing the light and spreading it evenly within trap portion 420 and through adhesive-coated inside surfaces 422. Another portion of the light may continue through rear wall 456 of trap portion 420 and into interior 430 of trap portion 420, where it illuminates adhesive-coated inside surfaces 422. A portion of the light entering trap portion 420 may continue through one or more openings 424 and is emitted into the surrounding area where the trap 410 is installed. Insects in the area are attracted to the UV and/or visible light transmitted through one or more openings 424, and fly or crawl into one or more openings 424 and onto adhesive coated inside surfaces 422, where they become stuck in the adhesive and are trapped. The user may observe trapped insects by looking through one or more openings 424. When a sufficient number of insects have been trapped, the user may easily remove and discard the entire used trap portion 420 without touching trapped insects, insect debris or adhesive, which remain out of reach inside trap portion 314, and replace it with a new trap portion 420. The new trap portion 420 may have fresh adhesive-coated inside surfaces 422, a clean opening 426 in rear surface 428 through which the UV and/or visible light is transmitted into trap portion 420, and the transparent or translucent material of trap portion 420 has not been degraded by prolonged exposure to UV light, thereby ensuring that insect trap 410 will continue to efficiently and effectively attract and trap insects.

It should be appreciated that a benefit of trap 410 is the manipulation of light within trap portion 420. In some embodiments, light manipulation occurs solely within trap portion 420. Light manipulation may include reflection, refraction, polarization and/or diffusion and is achieved by engaging with a manipulative element or surface (e.g., trap portion 420 and adhesive-coated inside surfaces 422). In some embodiments, light manipulation produces an even distribution of light on an adhesive surface or adhesive coating. In some embodiments, light is manipulated to produce a predetermined pattern on the adhesive coating or within trap portion 420, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 410 of this configuration may accommodate a variety of different trap portions 420 that may be removably mounted to base portion 412, each trap portion 420 being uniquely configured to attract and trap a specific species or multiple species of insects. For example, the overall size and shape of trap portion 420, and the size, shape, and orientation of openings 424 in trap portion 420, may be uniquely configured to attract and trap a specific species or multiple species of insects. For example, in some embodiments, trap portion 420 is approximately 20 mm to 600 mm wide, 20 mm to 600 mm high and 5 mm to 150 mm deep. In some embodiments, trap portion 420 is approximately 20 mm to 200 mm wide, 20 mm to 200 mm high and 5 mm to 80 mm deep. In some embodiments, trap portion 420 is approximately 20 mm to 130 mm wide, 20 mm to 130 mm high and 5 mm to 50 mm deep.

In some embodiments, base portion 412 is approximately 10 mm to 600 mm wide, 10 mm to 150 mm high and 10 mm to 150 mm deep. In some embodiments, base portion 412 is 10 mm to 200 mm wide, 10 mm to 100 mm high and 10 mm to 80 mm deep. In some embodiments, base portion 412 is 10 mm to 130 mm wide, 10 mm to 50 mm high and 10 mm to 50 mm deep.

As provided herein, openings 424 may be a variety of shapes and/or sizes. For example, openings 424 may be circular, square, rectangular, polygonal and/or elliptical in shape. Alternatively, openings 424 may be slots having straight, curved or undulating shapes or patterns. When openings 424 are circular, openings 424 may be approximately 0.5 mm to 30 mm in diameter. In some embodiments, circular openings 424 are approximately 0.5 mm to 20 mm in diameter. In some embodiments, circular openings 424 are approximately 0.5 mm to 15 mm in diameter. When openings 424 are slot shaped, openings 424 may be approximately 2 mm to 30 mm wide and 5 mm to 500 mm long. In some embodiments, slot openings 424 are approximately 2 mm to 20 mm wide and 5 mm to 200 mm long. In some embodiments, slot openings 320 are approximately 2 mm to 15 mm wide and 5 mm to 100 mm long.

In some embodiments, openings 424 cover all or a portion of trap portion 420. For example, openings 424 may cover a range of approximately 1% to 75% of the surface area of trap portion 420. In some embodiments, openings 424 cover approximately 5% to 50% of the surface area of trap portion 420. In some embodiments, openings 424 cover approximately 10% to 30% of the surface area of trap portion 420.

Figure 12:
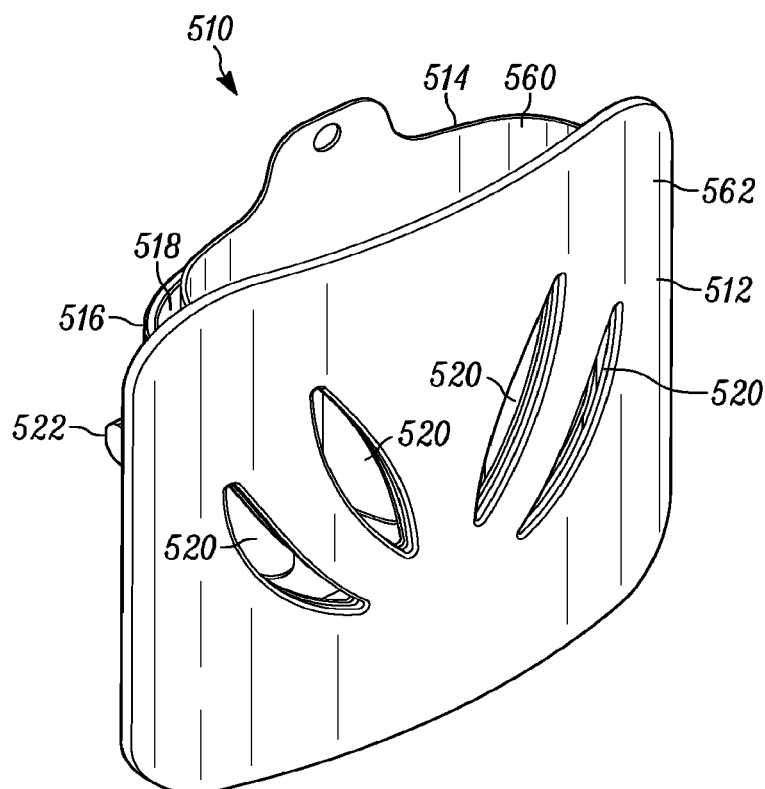
FIG. 12 is a front perspective view of a fifth embodiment of an insect trap in accordance with principles of the disclosure.
Figure 13:
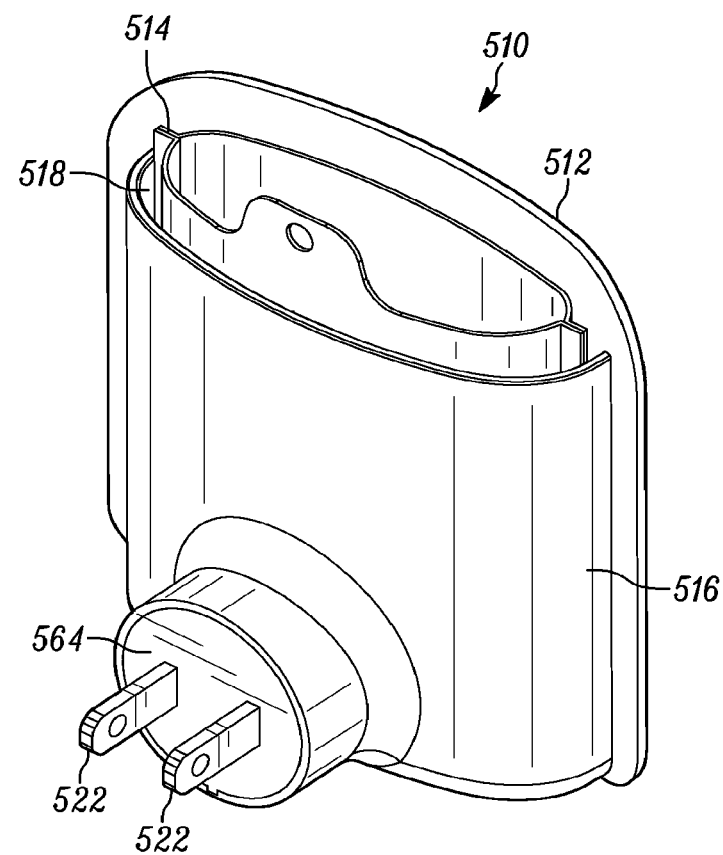
FIG. 13 is a rear perspective view of the insect trap of FIG. 12.

FIG. 12 is a front perspective view and FIG. 13 is a rear perspective view of a fifth embodiment of an insect trap, indicated generally at 510. Insect trap 510 includes a base portion 512 and a removable trap portion 514. Base portion 512 includes a housing 516 with a large opening 518 in top surface 560 to receive trap portion 514, one or more smaller openings 520 on front surface 562, and two electrically conductive prongs 522 on rear surface 564, adapted to mount insect trap 510 to a wall and provide power to insect trap 510 by inserting into a standard household electrical wall socket. While an electrical socket has been described as providing power to trap 510, any suitable power source may be used. Base portion 512 may be injection molded of opaque plastic, although other materials and construction techniques could also be used.

Figure 14:
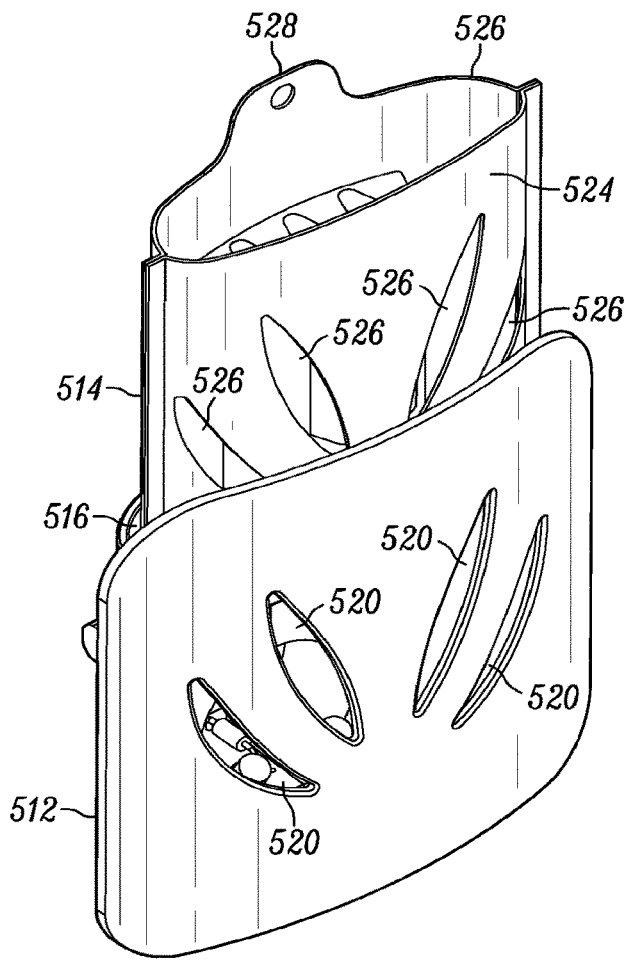
FIG. 14 is a front perspective view of the insect trap of FIG. 12 showing a trap portion partially removed from a base portion.

FIG. 14 is a front perspective view of insect trap 510 showing removable trap portion 514 partially removed from base portion 512. Trap portion 514 may include a housing 524 with one or more openings 526 and a tab 528 adapted for removing and replacing trap portion 514. Trap portion 514 may be removed by grasping tab 528 and lifting trap portion 514 out of housing 516 of base portion 512. In some embodiments, openings 526 in trap portion 514 match or correspond to openings 520 in base portion 512 with respect to size, shape, orientation and location, so that they align when trap portion 514 is mounted into base portion 512. In such embodiments, trap portion 514 may be viewed as an inner sleeve or pocket and base portion 512 may be viewed as an outer sleeve, where the inner sleeve can be dropped or inserted into the outer sleeve by a user.

Figure 15:
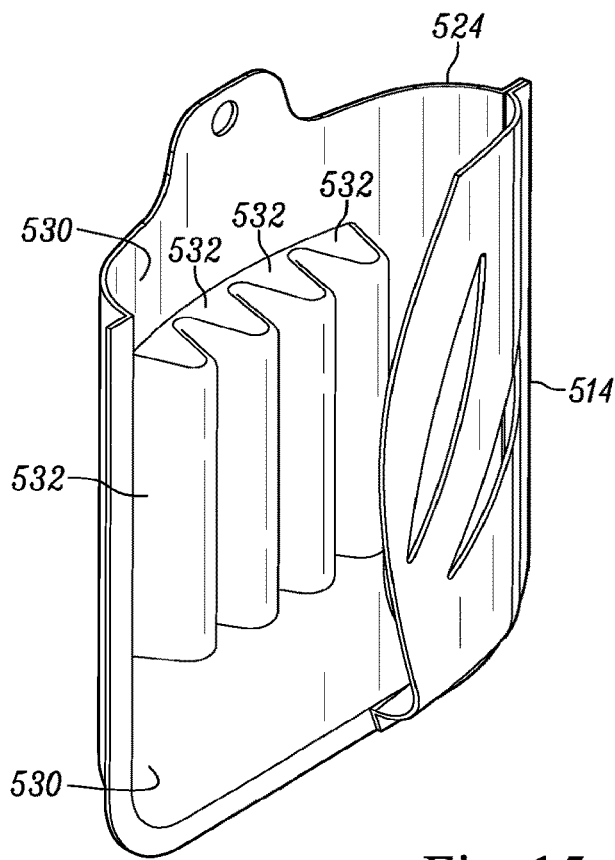
FIG. 15 is a perspective view, partly broken away, of the trap portion of the insect trap of FIG. 12.

FIG. 15 is a perspective view, partly broken away, of trap portion 514. Housing 524 includes inside surfaces 530 coated with translucent or transparent adhesive. As shown, housing 524 includes ribs 532 or other features that increase the adhesive-coated surface area, produce alternating light/dark regions that some insect species find attractive, and enhance the transmission of insect-attracting light into the interior of trap portion 514. In some embodiments, trap portion 514 is thermoformed of translucent or transparent sheet plastic, in two separate pieces, or in a 'clamshell' design, in which the two sides are joined at one side and folded together, although trap portion 514 could also be injection molded of translucent or transparent plastic or constructed of translucent paper or of other materials. In some embodiments, the material and thickness of trap portion 514 and the material and thickness of the adhesive are selected to transmit a substantial proportion of the UV and visible light, for example greater than 60% of the light is transmitted through trap portion 514 and the adhesive coating. The materials of the trap portion 514 may also include insect attractants. For example, the materials of the trap portion 514 may be impregnated with, or coated with, sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or any other substance that may provide a scent or other attractant that increases the insect-attracting efficiency of the insect trap. In such embodiments, the insect attractant is integral to trap portion 514. Alternatively, the insect attractants may be embedded in a separate piece that mounts on an inside surface 530 of housing 524 or through an opening 526 in housing 524. It is desirable for such attractants to be detectable by an insect for approximately a 2 meter radius from trap 510.

Figure 16:
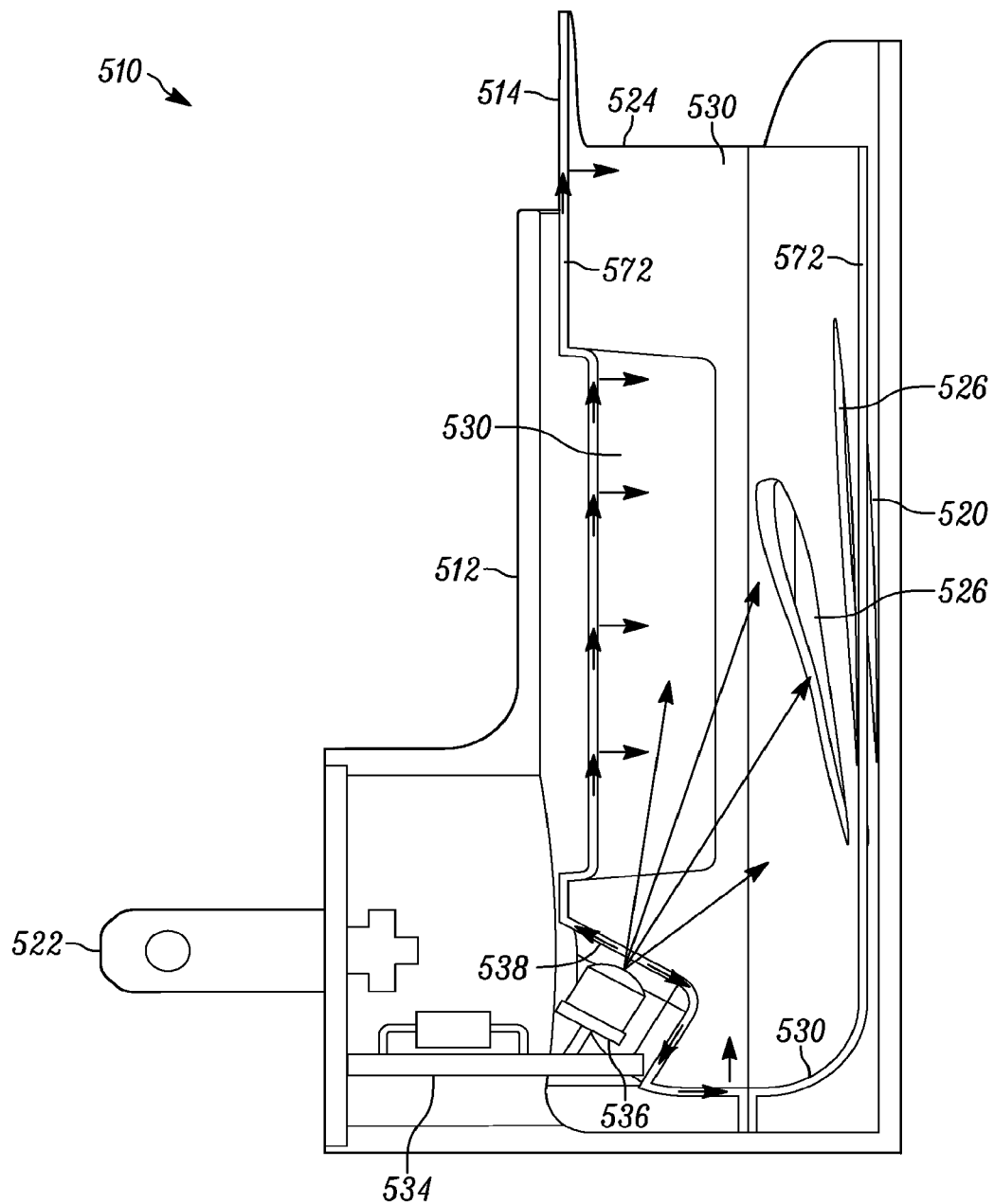
FIG. 16 is a cross-sectional view through the insect trap of FIG. 12 showing the interiors of the base portion and the trap portion.

FIG. 16 is a cross-sectional view through insect trap 510 showing the interiors of base portion 512 and trap portion 514. In some embodiments, base portion 512 includes a circuit board 534 having a programmable processor or chip (not shown) for executing commands, electrically connected to conductive prongs 522, only one of which is shown, and a lighting element such as one or more LEDs 536, one that emits ultraviolet (UV) light and/or one that emits visible light (e.g., blue light). For clarity, not all of the electrical connections are shown. The circuit board 534 may include electronic circuitry to receive any household current from conductive prongs 522 and provide power to illuminate the one or more LEDs 536. Alternatively, circuit board 534 may be configured to receive power from batteries (not shown) mounted in base portion 512. While an electrical socket and batteries have been described as providing power to trap 510, any suitable power source may be used. Circuit board 534 may include an energy stabilizer such as a full wave rectifier circuit or any other circuit to provide steady voltage to the one or more LEDs 536, although it could also provide a varying voltage to the one or more LEDs 536 to provide a flickering light, which some species of insect find attractive. For example, light flickering frequencies in the approximate range of 0.05 Hz (e.g., to mimic the breathing rate of mammals) to 270 Hz (e.g., the highest flicker frequency known to attract male houseflies), may be desirable and the lighting element may be configured to flicker within this range. Circuit board 534 may provide power to one or more LEDs 536 to provide both UV and visible light, although it could be configured to provide power to only one or more UV LEDs 536 or to only one or more visible light LEDs 536, or to provide variable power to produce combinations of flickering UV and visible light. Circuit board 534 may also be configured to drive a transmitter or transceiver such as a piezoelectric speaker or other device that may be mounted in base portion 512 to emit an insect-attracting sound. For example, the transmitter or transceiver may emit an insect-attracting sound having a frequency in the range of approximately 0.5 Hz (e.g., the heart rate of large mammals) to 240 KHz (e.g., the highest frequency detectable by insects). In some embodiments, the frequency is in the range of approximately 5 Hz to 100 KHz. In some embodiments, the frequency is in the range of approximately 35 Hz to 50 Khz. It is desirable for such insect-attracting sound to be detectable by an insect for approximately a 2 meter radius from trap 510. It is desirable for such insect-attracting sound to be undetectable by a human beyond approximately a 1 meter radius from trap 510.

In the operation of insect trap 510, conductive prongs 522 are inserted into a wall electrical socket. One or more LEDs 536 emit light, represented by arrows, preferably UV and visible light, which transmit though rear surface 538 of housing 524 of trap portion 514. In some embodiments, light is not manipulated in base portion 512 and is emitted directly into trap portion 514. A portion of the light continues within the enclosure, up one or more sides 572 of housing 524, and out through adhesive-coated inside surfaces 530. Another portion of the light may continue through the wall of housing 524 and into the enclosure, where it illuminates the adhesive-coated inside surfaces 530. A portion of the light entering the enclosure may continue through openings 526 in trap portion 514 and corresponding openings 520 in base portion and be emitted into the area where the insect trap 510 is installed. Insects in the area are attracted to the UV and/or visible light transmitted through openings 520 in base portion 512, and fly or crawl into openings 520 and onto the adhesive-coated inside surfaces 530 of trap portion 514, where they become stuck in the adhesive and are trapped. The user may observe trapped insects by looking through openings 520 and 526. When a sufficient number of insects have been trapped, the user may easily remove and discard the entire used trap portion 514 without touching trapped insects, insect debris or adhesive, which remain out of reach inside trap portion 514, and replace it with a new trap portion 514. The new trap portion 514 may include fresh adhesive coating its inside surfaces 530, housing 524 has a clean rear surface 538, through which the UV and visible light is transmitted into trap portion 514, and the transparent or translucent material of trap portion 514 has not been degraded by prolonged exposure to UV light, thereby ensuring that insect trap 510 will continue to efficiently and effectively attract and trap insects.

It should be appreciated that a benefit of trap 510 is the manipulation of light within trap portion 514. In some embodiments, light manipulation occurs solely within trap portion 514. Light manipulation may include reflection, refraction, polarization and/or diffusion and is achieved by engaging with a manipulative element or surface (e.g., housing 516 and adhesive-coated inside surfaces 530). In some embodiments, light manipulation produces an even distribution of light on an adhesive surface or adhesive coating. In some embodiments, light is manipulated to produce a predetermined pattern on the adhesive coating or within trap portion 514, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 510 of this configuration may accommodate a variety of different trap portions 514 that may be removably mounted to base portion 512, each trap portion 514 being uniquely configured to attract and trap a specific species or multiple species of insects. For example, the overall size and shape of trap portion 514, and the size, shape, and orientation of openings 526 in housing 524 of trap portion 514, may be uniquely configured to attract and trap a specific species or multiple species of insects. For example, in some embodiments, trap portion 514 is approximately 20 mm to 600 mm wide, 20 mm to 600 mm high and 5 mm to 150 mm deep. In some embodiments, trap portion 514 is approximately 20 mm to 200 mm wide, 20 mm to 200 mm high and 5 mm to 80 mm deep. In some embodiments, trap portion 514 is approximately 20 mm to 130 mm wide, 20 mm to 130 mm high and 5 mm to 50 mm deep.

In some embodiments, base portion 512 is approximately 20 mm to 600 mm wide, 10 mm to 150 mm high and 10 mm to 150 mm deep. In some embodiments, base portion 512 is 20 mm to 200 mm wide, 10 mm to 100 mm high and 10 mm to 80 mm deep. In some embodiments, base portion 512 is 20 mm to 130 mm wide, 10 mm to 50 mm high and 10 mm to 50 mm deep.

As provided herein, openings 526 and openings 520 may be a variety of shapes and/or sizes. For example, openings 526 and openings 520 may be circular, square, rectangular, polygonal and/or elliptical in shape. Alternatively, openings 526 and openings 520 may be slots having straight, curved or undulating shapes or patterns. When openings 526 and openings 520 are circular, openings 526 and openings 520 may be approximately 0.5 mm to 30 mm in diameter. In some embodiments, circular openings 526 and circular openings 520 are approximately 0.5 mm to 20 mm in diameter. In some embodiments, circular openings 526 and circular openings 520 are approximately 0.5 mm to 15 mm in diameter. When openings 526 and openings 520 are slot shaped, openings 526 and openings 526 may be approximately 2 mm to 30 mm wide and 5 mm to 500 mm long. In some embodiments, slot openings 526 and slot openings 520 are approximately 2 mm to 20 mm wide and 5 mm to 200 mm long. In some embodiments, slot openings 526 and slot openings 520 are approximately 2 mm to 15 mm wide and 5 mm to 100 mm long.

In some embodiments, openings 526 cover all or a portion of trap portion 514. For example, openings 526 may cover a range of approximately 1% to 75% of the surface area of trap portion 514. In some embodiments, openings 526 cover approximately 5% to 50% of the surface area of trap portion 514. In some embodiments, openings 526 cover approximately 10% to 30% of the surface area of trap portion 514.

Figure 17:
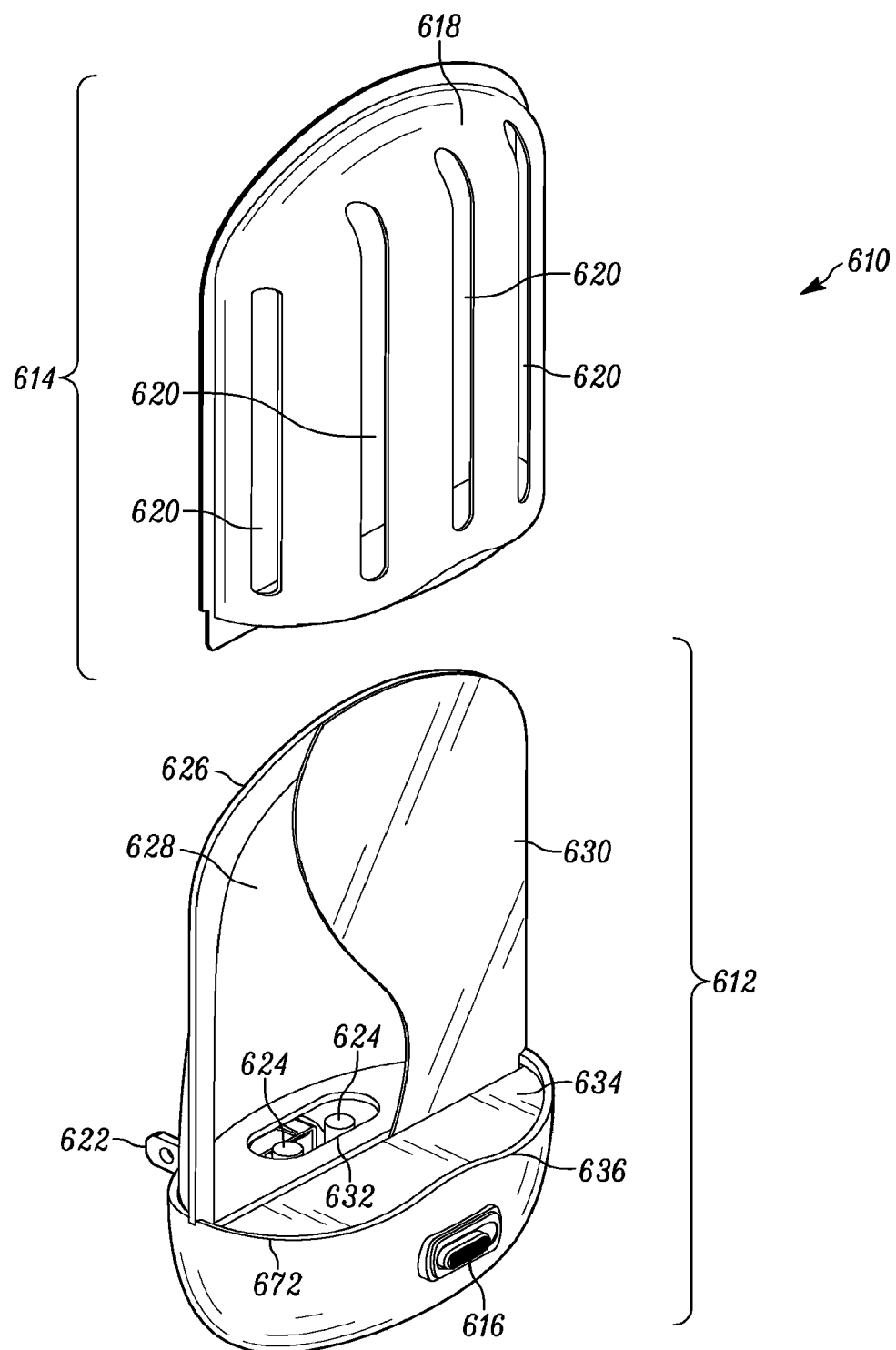
FIG. 17 is an exploded view of a sixth embodiment of an insect trap in accordance with principles of the disclosure.

FIG. 17 shows an exploded view of a sixth embodiment of an insect trap, indicated generally at 610. Insect trap 610 includes a base portion 612 and a removable trap portion 614. Trap portion 614 is shown removed from base portion 612 in this view. In some embodiments, base portion 612 includes a switch 616, configurable to enable insect trap 610 to be turned on or off by closing or opening switch 616, as desired by the user. Alternatively, switch 616 may be configured to control other features such as light intensity, combinations of light wavelengths, different modes or frequencies of flickering light, an automatic setting that turns on when the room gets dark, or a remote control setting, for example. Trap portion 614 includes a front housing 618 with at least one opening 620.

Protruding from a rear surface 670 (shown in FIG. 18) of base portion 612 are two electrically conductive prongs 622, only one of which is shown, adapted to mount insect trap 610 to a wall and provide power to insect trap 610 by inserting prongs 622 into a standard household electrical wall socket. Alternatively, base portion 612 may be configured to sit or hang wherever desired and receive power from batteries (not shown) mounted in base portion 612. While an electrical socket and batteries have been described as providing power to trap 610, any suitable power source may be used. Base portion 612 includes a lighting element such as one or more LEDs 624 and a rear housing 626 which includes a reflective-coated inside surface 628. In some embodiments, the LEDs include one that emits ultraviolet (UV) light and one that emits visible light (e.g., blue light). In some embodiments, the lighting element emits a combination of wavelengths to mimic sunlight. In some embodiments, the material and surface finish of rear housing 626 may be configured to reflect UV and/or visible light without a reflective coating. As shown, base portion 612 includes a transparent or translucent window 630, shown partially cut away to reveal the LEDs 624. Transparent or translucent window 630 protects the reflective-coated inside surface 628 of rear housing 626 and one or more LEDs 624 from dust and insect debris and allows base portion 612 to be easily cleaned. Transparent or translucent window 630 may be attached at its perimeter (not shown) to rear housing 626 by any suitable manufacturing technique such as gluing or ultrasonic welding. In some embodiments, transparent or translucent window 630 is removably attached to rear housing 626. Base portion 612 includes one or more openings 632. In some embodiments, on perimeter 672 of top surface 634 of base 612 is an upwardly directed rim or protrusions 636.

Figure 18:
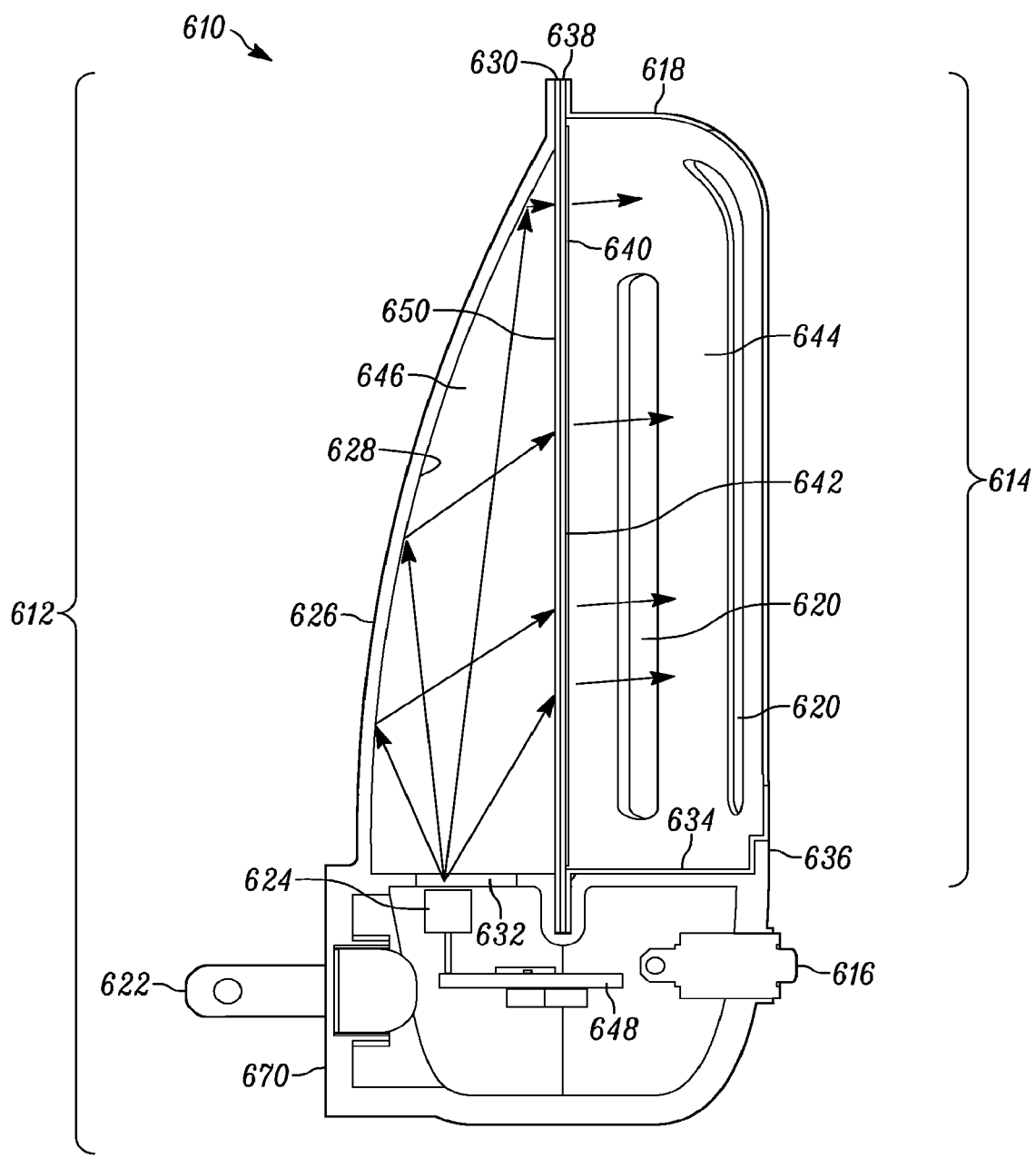
FIG. 18 is a cross-sectional view through the insect trap of FIG. 17 showing the interiors of a base portion and a trap portion.

FIG. 18 shows a cross-sectional view of the of insect trap 610, with removable trap portion 614 mounted on base portion 612, and showing the interiors of base portion 612 and removable trap portion 614. Removable trap portion 614 includes front housing 618 with the at least one opening 620 and a back plate 638, which may be constructed of transparent or translucent material and coated with a transparent or translucent adhesive 640 on a front surface 642. In some embodiments, the material and thickness of back plate 638 and the material and thickness of the adhesive 640 are selected to transmit a substantial proportion of the UV and/or visible light, for example greater than 60% of the light is transmitted through back plate 638 and adhesive 640. Front housing 618 of trap portion 614 and rear housing 626 of base portion 612 may be constructed from any suitable material, including a thermoformed opaque plastic material or other opaque, transparent or translucent materials such as paper, paperboard, cardboard or paper pulp. In some embodiments, front housing 618 and rear housing 626 are constructed by injection molding or by other suitable manufacturing techniques. Back plate 638 may be substantially planar, although it may be formed into a convex, concave or saddle-shaped contour, or a combination of contours to optimize the even distribution of light. Alternatively, back plate 638 may have ribs or other features that increase the adhesive-coated surface area, produce alternating light/dark regions that some insect species find attractive, and enhance the transmission of insect-attracting light into trap portion 614.

In some embodiments, front housing 618 is be coated with transparent, translucent or opaque adhesive on an inside surface to provide additional insect trapping efficiency and capacity. In addition, front housing 618 may also have a reflective coating underneath the adhesive coating on its inside surface to enhance its attraction to insects and further improve the insect trapping efficiency and effectiveness. Front housing 618 and back plate 638 may be joined together at their perimeters with adhesive, although they may also be joined by other commonly used packaging assembly techniques such as ultrasonic welding or RF sealing, or any other suitable assembly method. The materials of trap portion 614 may include an insect attractant. For example, the materials of trap portion 614 may be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of the insect trap. In such embodiments, the insect attractant is integral to trap portion 614. Alternatively, the insect attractants may be embedded in a separate piece that mounts on an inside surface of front housing 618 or through an opening 620 in front housing 618 or on front surface 642 of back plate 638. It is desirable for such attractants to be detectable by an insect for approximately a 2 meter radius from trap 610.

As shown, front housing 618 and back plate 638 form a front enclosure 644 in trap portion 614, and rear housing 626 and window 630 form a rear enclosure 646 in base portion 612. In some embodiments, base portion 612 includes a circuit board 648 having a programmable processor or chip (not shown) for executing commands, electrically connected to conductive prongs 622, switch 616 and one or more LEDs 624. For clarity, however, not all of the electrical connections are shown. Circuit board 648 may include electronic circuitry to receive ordinary household current from conductive prongs 622, respond to the position of switch 616 and provide power to illuminate one or more LEDs 624. Circuit board 648 may include an energy stabilizer such as a full wave rectifier circuit or any other circuit that provides steady voltage to one or more LEDs 624 when switch 616 is in a closed position, although it may also provide a varying voltage to one or more LEDs 624 to provide a flickering light, which some species of insects find attractive. For example, light flickering frequencies in the approximate range of 0.05 Hz (e.g., to mimic the breathing rate of large mammals) to 250 Hz (e.g., the highest flicker frequency known to attract male houseflies), may be desirable and the lighting element may be configured to flicker within this range. Circuit board 648 may provide power to one or more LEDs 624 to provide both UV and visible light, although it may be configured to provide power to only one or more UV LEDs 624 or to only one or more visible light LEDs 624, or to provide variable power to produce combinations of flickering UV and visible light. Circuit board 648 may also be configured to drive a transmitter or transceiver such as a piezoelectric speaker or other device that may be mounted in the base portion 612 to emit an insect-attracting sound. For example, the transmitter or transceiver may emit an insect-attracting sound having a frequency in the range of approximately 0.5 Hz (e.g., the heart rate of large mammals) to 240 KHz (e.g., the highest frequency detectable by insects). In some embodiments, the frequency is in the range of approximately 5 Hz to 100 KHz. In some embodiments, the frequency is in the range of approximately 35 Hz to 50 Khz. It is desirable for such insect-attracting sound to be detectable by an insect for approximately a 2 meter radius from trap 610. It is desirable for such insect-attracting sound to be undetectable by a human beyond approximately a 1 meter radius from trap 610.

As shown, upward protrusions or rim 636 on top surface 634 of base portion 612 engage with trap portion 614 to secure it in place during use, although any other form of attachment may be substituted that allows trap portion 614 to be securely but removably mounted to base portion 612.

In the operation of insect trap 610, conductive prongs 622 are inserted into a wall electrical socket, and switch 616 is moved to a closed position. One or more LEDs 624 emit light, preferably UV and visible light, represented by arrows, which transmit through at least one opening 632 in base portion 612, into rear enclosure 646, and onto reflective-coated inside surface 628 of rear housing 626 and rear surface 650 of window 630. In some embodiments, light is not manipulated in base portion 612 and is emitted directly into trap portion 614. Reflective-coated inside surface 628 of rear housing 626 may include a concave shape and may be configured to reflect the UV and visible light from one or more LEDs 624 to distribute the light evenly onto rear surface 650 of window 630, although inside surface 628 of rear housing 626 may have a convex shape or a saddle shape or a combination of shapes, or may also have ribs or other features to more evenly distribute the light. Alternatively, an optical enhancer such as an anamorphic lens (not shown) or any other lens or combination of lenses configured to distribute UV and/or visible light (e.g., evenly, according to specific patterns, at a focal point, etc.) onto rear surface 650 of window 630, may be mounted to base portion 612 at or near opening 632 in base portion 612, and may replace or augment the role of reflective-coated inside surface 628 of rear housing 626. Alternatively, the UV and/or visible light from one or more LEDs 624 may directly strike rear surface 650 of window 630 at an oblique angle (e.g., an acute angle from approximately 0° to 90°) and be spread across and through window 630 of base portion 612 and onto back plate 638 of trap portion 614, and may replace or augment the role of reflective-coated inside surface 628 of rear housing 626 or of the lens or lenses mounted to base portion 612. The light may transmit through back plate 638 and adhesive coating 640 on front surface 642, and into front enclosure 644. The light may be further evenly distributed by light-diffusing properties of window 630 of base portion 612, back plate 638 of trap portion 614, adhesive coating 640 on front surface 642 of back plate 638, or any combination of window 630, back plate 638 and adhesive coating 640. In some embodiments, a portion of the light entering front enclosure 644 continues through one or more openings 620 in front housing 618 and is emitted into the area where the trap is installed. Insects may be attracted to the UV and/or visible light transmitted through adhesive coating 640 and/or through one or more openings 620 in front housing 618, and fly or crawl into one or more openings 620 and onto adhesive coating 640, where they become trapped in the adhesive. The user may observe trapped insects by looking through one or more openings 620 in front housing 618. When a sufficient number of insects have been trapped, the user may easily remove and discard the entire used trap portion 614 without touching trapped insects, insect debris or adhesive, which remain out of reach inside trap portion 614, and replace it with a new trap portion 614. The new trap portion 614 may have fresh adhesive-coated surfaces, ensuring that insect trap 610 will continue to efficiently and effectively attract and trap insects.

It should be appreciated that a benefit of trap 610 is the manipulation of light within trap portion 614. In some embodiments, light manipulation occurs solely within trap portion 614. Light manipulation may include reflection, refraction, polarization and/or diffusion and is achieved by engaging with a manipulative element or surface (e.g., inside surface 628, window 630, back plate 638 and adhesive coating 640). In some embodiments, light manipulation produces an even distribution of light on an adhesive surface or adhesive coating 640. In some embodiments, light is manipulated to produce a predetermined pattern on the adhesive coating 640 or within trap portion 614, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 610 of this configuration may accommodate a variety of different trap portions 614 that may be removably mounted to base portion 612, each trap portion 614 being uniquely configured to attract and trap a specific species or multiple species of insects. For example, the overall size and shape of trap portion 614, and the size, shape, and orientation of openings 620 in front housing 618 of trap portion 614, may be uniquely configured to attract and trap a specific species or multiple species of insects. For example, in some embodiments, trap portion 614 is approximately 20 mm to 600 mm wide, 20 mm to 600 mm high and 5 mm to 150 mm deep. In some embodiments, trap portion 614 is approximately 20 mm to 200 mm wide, 20 mm to 200 mm high and 5 mm to 80 mm deep. In some embodiments, trap portion 614 is approximately 20 mm to 130 mm wide, 20 mm to 130 mm high and 5 mm to 50 mm deep.

In some embodiments, base portion 612 is approximately 20 mm to 600 mm wide, 10 mm to 150 mm high and 10 mm to 150 mm deep. In some embodiments, base portion 612 is 20 mm to 200 mm wide, 10 mm to 100 mm high and 10 mm to 80 mm deep. In some embodiments, base portion 612 is 20 mm to 130 mm wide, 10 mm to 50 mm high and 10 mm to 50 mm deep.

As provided herein, openings 620 may be a variety of shapes and/or sizes. For example, openings 620 may be circular, square, rectangular, polygonal and/or elliptical in shape. Alternatively, openings 620 may be slots having straight, curved or undulating shapes or patterns. When openings 620 are circular, openings 620 may be approximately 0.5 mm to 30 mm in diameter. In some embodiments, circular openings 620 are approximately 0.5 mm to 20 mm in diameter. In some embodiments, circular openings 620 are approximately 0.5 mm to 15 mm in diameter. When openings 620 are slot shaped, openings 620 may be approximately 2 mm to 30 mm wide and 5 mm to 500 mm long. In some embodiments, slot openings 620 are approximately 2 mm to 20 mm wide and 5 mm to 200 mm long. In some embodiments, slot openings 120 are approximately 2 mm to 15 mm wide and 5 mm to 100 mm long.

In some embodiments, openings 620 cover all or a portion of trap portion 614. For example, openings 620 may cover a range of approximately 1% to 75% of the surface area of trap portion 614. In some embodiments, openings 620 cover approximately 5% to 50% of the surface area of trap portion 614. In some embodiments, openings 620 cover approximately 10% to 30% of the surface area of trap portion 614.

Figure 19:
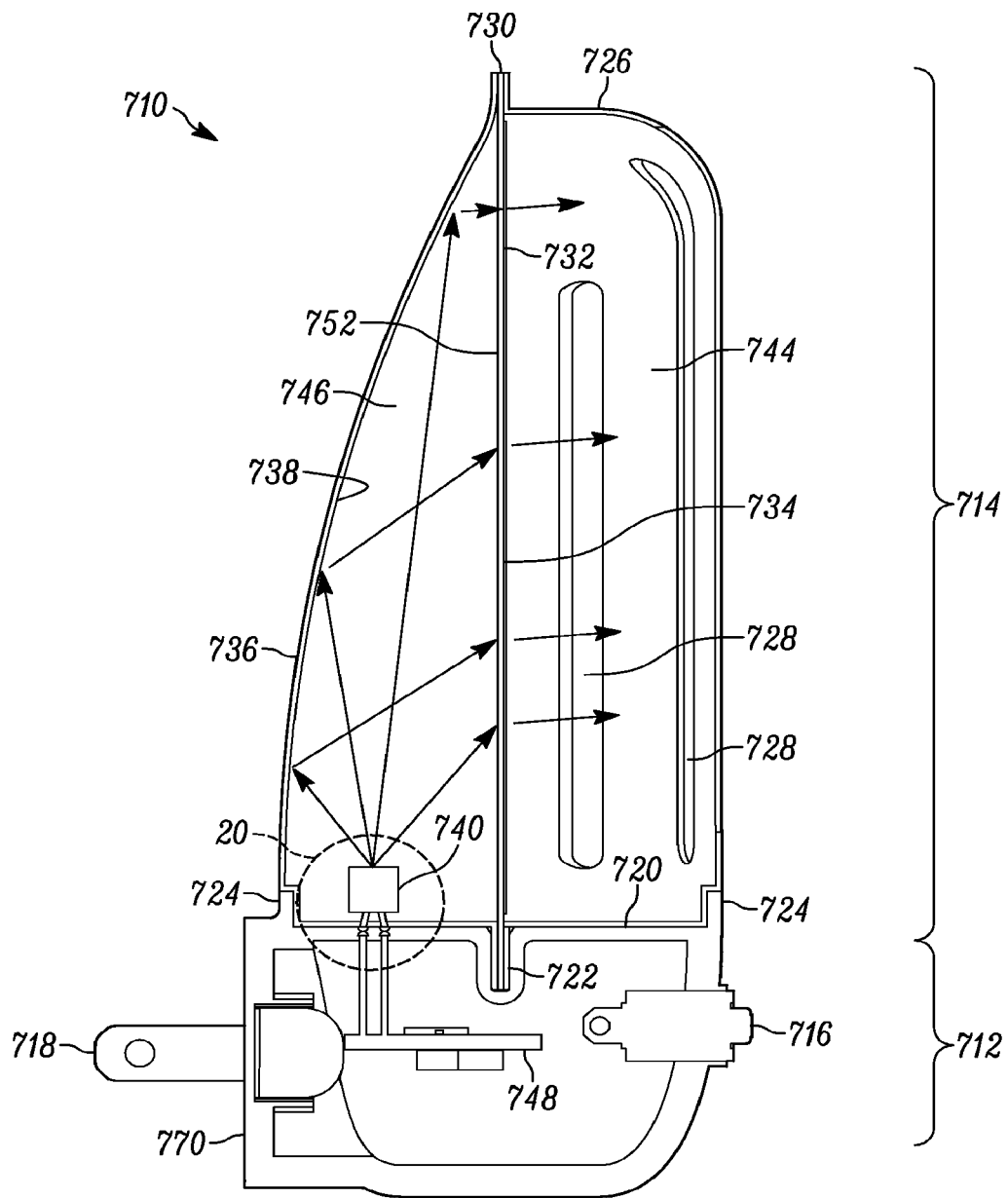
FIG. 19 is a cross-sectional view through a seventh embodiment of an insect trap in accordance with principles of the disclosure.
Figure 20:
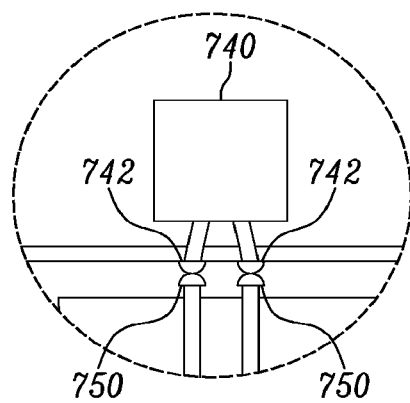
FIG. 20 is an enlarged view of a portion of FIG. 19.

FIG. 19 shows a cross-sectional view of a seventh embodiment of an insect trap, indicated generally at 710, and FIG. 20 is an enlarged view of a portion of FIG. 19. Insect trap 710 includes a base portion 712 and a removable trap portion 714. As shown, base portion 712 includes a switch 716, configurable to enable insect trap 710 to be turned on or off by closing or opening switch 716, as desired by the user. Alternatively, switch 716 may be configured to control other features such as light intensity, combinations of light wavelengths, different modes or frequencies of flickering light, an automatic setting that turns on when the room gets dark, or a remote control setting, for example. Protruding from a rear surface 770 of base portion 712 are two electrically conductive prongs 718 (only one of which is shown in this view) adapted to mount insect trap 710 to a wall and provide power to insect trap 710 by inserting prongs 718 into a standard household electrical wall socket. Alternatively, base portion 712 may be configured to sit or hang wherever desired and receive power from batteries (not shown) mounted in base portion 712. While an electrical socket and batteries have been described as providing power to trap 710, any suitable power source may be used. In some embodiments, a slot 722 is located in a top surface 720 of base portion 712, and upwardly directed protrusions 724 are located on a perimeter of top surface 720.

Trap portion 714 includes a front housing 726 with at least one opening 728, a divider 730, a rear housing 736, a lighting element such as one or more LEDs 740, and electrical trap contacts 742. In some embodiments, divider 730 is constructed from transparent or translucent material and is coated with a transparent or translucent adhesive 732 on a front surface 734. In some embodiments, the material and thickness of the divider 730 and the material and thickness of the adhesive 732 are selected to transmit a substantial proportion of the UV and/or visible light, for example greater than 60% of the light is transmitted through divider 730 and adhesive 732. In some embodiments, LEDs 740 include one that emits ultraviolet (UV) light and one that emits visible light (e.g., blue light). In some embodiments, the lighting element emits a combination of wavelengths to mimic sunlight. As shown, there are two electrical trap contacts 742 for each of the one or more LEDs 740. Thus, each pair of trap contacts 742 are electrically connected to their respective LED 740.

In some embodiments, rear housing 736 includes a reflective-coated inside surface 738. The material and surface finish of rear housing 736 may alternatively be configured to reflect UV and/or visible light without a reflective coating. Front housing 726 and rear housing 736 may be constructed from any suitable material, including a thermoformed opaque plastic material or other opaque, transparent or translucent materials such as paper, paperboard, cardboard or paper pulp. In some embodiments, front housing 726 and rear housing 736 are constructed by injection molding or by other suitable manufacturing techniques.

As shown, divider 730 may be substantially planar, although it may be formed into a convex, concave or saddle-shaped contour, or a combination of contours to optimize the even distribution of light. Alternatively, divider 730 may include ribs or other features that increase the adhesive-coated surface area, produce alternating light/dark regions that some insect species find attractive, and enhance the transmission of insect-attracting light into interior of trap portion 714. In some embodiments, front housing 726 is coated with transparent, translucent or opaque adhesive on an inside surface to provide additional insect trapping efficiency and capacity. In addition, front housing 726 may include a reflective coating underneath the adhesive coating on an inside surface to enhance its attraction to insects and further improve the insect trapping efficiency and effectiveness. Front housing 726, divider 730 and rear housing 736 may be joined together at their perimeters with adhesive, although they may also be joined by other commonly used packaging assembly techniques such as ultrasonic welding or RF sealing, or any other suitable assembly method.

The materials of trap portion 714 may also include insect attractants. For example, trap portion 714 may be impregnated with be impregnated with sorbitol, coleopteran attractants including brevicomin, dominicalure, frontalin, grandlure, ipsdienol, ipsenol, japonilure, lineatin, megatomoic acid, multistriatin, oryctalure, sulcatol, and trunc-call, dipteran attractants including ceralure, cue-lure, latilure, medlure, moguchun, muscalure, and trimedlure, homopteran attractants including rescalure, lepidopteran attractants such as disparlure, straight chain lepidopteran pheromones including codlelure, gossyplure, hexalure, litlure, looplure, orfralure, and ostramone, and other insect attractants such as eugenol, methyl eugenol, and siglure, or other substances to provide a scent that further increases the insect-attracting efficiency of the insect trap. In such embodiments, the insect attractant is integral to trap portion 714. Alternatively, the insect attractants may be embedded in a separate piece that mounts on an inside surface of front housing 726 or through an opening 728 in front housing 726 or on front surface 734 of divider 730. It is desirable for such attractants to be detectable by an insect for approximately a 2 meter radius from trap 710. As shown, divider 730 separates trap portion 714 into a front enclosure 744 and a rear enclosure 746.

In some embodiments, base portion 712 includes a circuit board 748 having a programmable processor or chip (not shown) for executing commands, electrically connected to conductive prongs 718, switch 716, and electrical base contacts 750. For clarity, however, not all of the electrical connections are shown. While two base contacts 750 in the base portion 712 for each of the LEDs 740 in the trap portion 714 are shown, any suitable number may be used. Base contacts 750 may be configured to provide an electrical connection with trap contacts 742 when trap portion 714 is removably mounted to base portion 712. Circuit board 748 may include electronic circuitry to receive ordinary household current from conductive prongs 718, respond to the position of switch 716 and provide power to base contacts 750, which, in turn, provide power to trap contacts 742 and illuminate LEDs 740 in trap portion 714 when trap portion 714 is mounted to base portion 712. In some embodiments, circuit board 748 includes an energy stabilizer such as a full wave rectifier circuit or any other circuit that provides steady voltage to one or more LEDs 740 when switch 716 is in a closed position and trap portion 714 is mounted to base portion 712, although it may also provide a varying voltage to one or more LEDs 740 to provide a flickering light, which some species of insects find attractive. For example, light flickering frequencies in the approximate range of 0.05 Hz (e.g., to mimic the breathing rate of large mammals) to 250 Hz (e.g., the highest flicker frequency known to attract male houseflies), may be desirable and the lighting element may be configured to flicker within this range. Circuit board 748 may provide power to one or more LEDs 740 to provide both UV and visible light, although it may be configured to provide power to only one or more UV LEDs 740 or to only one or more visible light LEDs 740, or to provide variable power to produce combinations of flickering UV and visible light. Circuit board 748 may also be configured to drive a transmitter or transceiver such as a piezoelectric speaker or other device that may be mounted in base portion 712 to emit an insect-attracting sound. For example, the transmitter or transceiver may emit an insect-attracting sound having a frequency in the range of approximately 0.5 Hz (e.g., the heart rate of large mammals) to 240 KHz (e.g., the highest frequency detectable by insects). In some embodiments, the frequency is in the range of approximately 5 Hz to 100 KHz. In some embodiments, the frequency is in the range of approximately 35 Hz to 50 Khz. It is desirable for such insect-attracting sound to be detectable by an insect for approximately a 2 meter radius from trap 710. It is desirable for such insect-attracting sound to be undetectable by a human beyond approximately a 1 meter radius from trap 710.

In some embodiments, base portion 712 includes a slot 722 and protrusions 724 in top surface 720, which are configured to engage with trap portion 714 to secure it in place during use, although any other form of attachment may be substituted that allows trap portion 714 to be securely but removably mounted to base portion 712.

In the operation of insect trap insect trap 710, conductive prongs 718 are inserted into a wall electrical socket, switch 716 is moved to a closed position, and trap portion 714 is mounted to base portion 712. One or more LEDs 740 emit light, represented by arrows, preferably UV and visible light, which transmit light into rear enclosure 746, and onto reflective-coated inside surface 738 of rear housing 736 and rear surface 752 of divider 730. In some embodiments, light is not manipulated in base portion 712 and is emitted directly into trap portion 714. Reflective-coated inside surface 738 of rear housing 736 may be a concave shape and configured to reflect UV and/or visible light from one or more LEDs 740 to distribute the light evenly onto rear surface 752 of divider 730, although the shape of inside surface 738 of rear housing 736 may have a convex shape or a saddle shape or a combination of shapes, or may also have ribs (not shown) or other features to more evenly distribute the light. Alternatively, an optical enhancer such as an anamorphic lens (not shown) or any other lens or combination of lenses configured to distribute UV and/or visible light (e.g., evenly, according to specific patterns, at a focal point, etc.) onto rear surface 752 of divider 730, may be mounted to rear housing 736 proximate to or above LEDs 740 or may be mounted to LEDs 740, and may replace or augment the role of reflective-coated inside surface 738 of rear housing 736. Alternatively, the UV and/or visible light from one or more LEDs 740 may directly strike the rear surface 752 of divider 730 at an oblique angle (e.g., an acute angle from approximately 0° to 90°) and may be spread across divider 730, and may replace or augment the role of reflective-coated inside surface 738 of rear housing 736, or of the lens or lenses mounted to rear housing 736 or to LEDs 740. The light may transmit through divider 730 and adhesive coating 732 on front surface 734, and into front enclosure 744. The light may be further evenly distributed by the light-diffusing properties of divider 730, adhesive coating 732 on front surface 734, or both. A portion of the light entering front enclosure 744 continues through one or more openings 728 in front housing 726 and is emitted into the area where trap 710 is installed. Insects may be attracted to the UV and/or visible light transmitted through adhesive coating 732 and/or through one or more openings 728 in front housing 726, and fly or crawl into one or more openings 728 and onto adhesive coating 732, where they become trapped in the adhesive. The user may observe trapped insects by looking through one or more openings 728 in front housing 726. When a sufficient number of insects have been trapped, the user may easily remove and discard the entire used trap portion 714 without touching trapped insects, insect debris or adhesive, which remain out of reach inside trap portion 714, and replace it with a new trap portion 714. The new trap portion 714 may have fresh adhesive-coated surfaces and light-directing surfaces, ensuring that the insect trap 710 will continue to efficiently and effectively attract and trap insects.

It should be appreciated that a benefit of trap 710 is the manipulation of light within trap portion 714. In some embodiments, light manipulation occurs solely within trap portion 714. Light manipulation may include reflection, refraction, polarization and/or diffusion and is achieved by engaging with a manipulative element or surface (e.g., inside surface 738, divider 730 and adhesive coating 732). In some embodiments, light manipulation produces an even distribution of light on an adhesive surface or adhesive coating. In some embodiments, light is manipulated to produce a predetermined pattern on the adhesive coating or within trap portion 714, for example, an even distribution, an even distribution with hot spots of higher intensity, hot spot patterns, and/or combinations thereof.

Any suitable adhesive material may be used as part of an adhesive surface for trapping an insect. In some embodiments, pressure sensitive adhesives such as acrylics, butyl rubber, natural rubber, nitriles, silicones, styrene block copolymers, styrene-ethylene/propylene, styrene-isoprene-styrene, vinyl ethers may be used. Generally, the thickness of such adhesives will be in the range of approximately 0.01 mm to 1 mm. In some embodiments, the adhesive thickness is in the range of approximately 0.05 mm to 0.2 mm, with a thickness of approximately 0.1 mm being most often used.

An insect trap 710 of this configuration may accommodate a variety of different trap portions 714 that may be removably mounted to base portion 712, each trap portion 714 being uniquely configured to attract and trap a specific species or multiple species of insects. For example, the overall size and shape of trap portion 714, the size, shape, and orientation of openings 728 in front housing 726 of trap portion 714, and the wavelength and intensity of the LEDs 740 may be uniquely configured to attract and trap a specific species or multiple species of insects. For example, in some embodiments, trap portion 714 is approximately 20 mm to 600 mm wide, 20 mm to 600 mm high and 5 mm to 150 mm deep. In some embodiments, trap portion 714 is approximately 20 mm to 200 mm wide, 20 mm to 200 mm high and 5 mm to 80 mm deep. In some embodiments, trap portion 714 is approximately 20 mm to 130 mm wide, 20 mm to 130 mm high and 5 mm to 50 mm deep.

In some embodiments, base portion 712 is approximately 20 mm to 600 mm wide, 10 mm to 150 mm high and 10 mm to 150 mm deep. In some embodiments, base portion 712 is 20 mm to 200 mm wide, 10 mm to 100 mm high and 10 mm to 80 mm deep. In some embodiments, base portion 712 is 20 mm to 130 mm wide, 10 mm to 50 mm high and 10 mm to 50 mm deep.

As provided herein, openings 728 may be a variety of shapes and/or sizes. For example, openings 728 may be circular, square, rectangular, polygonal and/or elliptical in shape. Alternatively, openings 728 may be slots having straight, curved or undulating shapes or patterns. When openings 728 are circular, openings 728 may be approximately 0.5 mm to 30 mm in diameter. In some embodiments, circular openings 728 are approximately 0.5 mm to 20 mm in diameter. In some embodiments, circular openings 728 are approximately 0.5 mm to 15 mm in diameter. When openings 728 are slot shaped, openings 728 may be approximately 2 mm to 30 mm wide and 5 mm to 500 mm long. In some embodiments, slot openings 728 are approximately 2 mm to 20 mm wide and 5 mm to 200 mm long. In some embodiments, slot openings 728 are approximately 2 mm to 15 mm wide and 5 mm to 100 mm long.

In some embodiments, openings 728 cover all or a portion of trap portion 714. For example, openings 728 may cover a range of approximately 1% to 75% of the surface area of trap portion 714. In some embodiments, openings 728 cover approximately 5% to 50% of the surface area of trap portion 714. In some embodiments, openings 728 cover approximately 10% to 30% of the surface area of trap portion 714.

Figure 21:
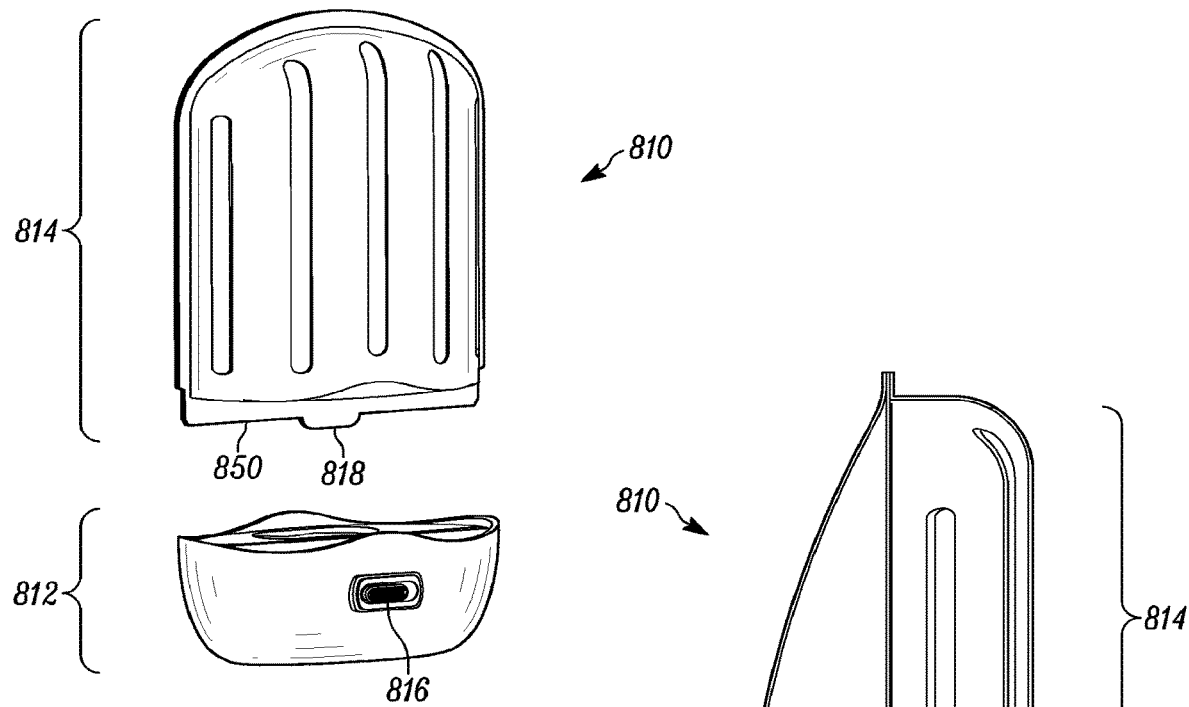
FIG. 21 is a perspective view of an eighth embodiment of an insect trap in accordance with principles of the disclosure showing a trap portion removed from a base portion.

FIG. 21 is a perspective view of an eighth embodiment of an insect trap, indicated generally at 810. Insect trap 810 includes a trap portion 814 and a base portion 812. In FIG. 21, trap portion 814 is shown removed from the base portion 812. In some embodiments, trap portion 814 includes a tab 818 protruding downward from a bottom surface 850. Base portion 812 may have a corresponding opening 824 (shown in FIG. 23) to receive tab 818 when trap portion 814 is mounted to base portion 812. As shown, base portion 812 includes a switch 816.

Figure 22:
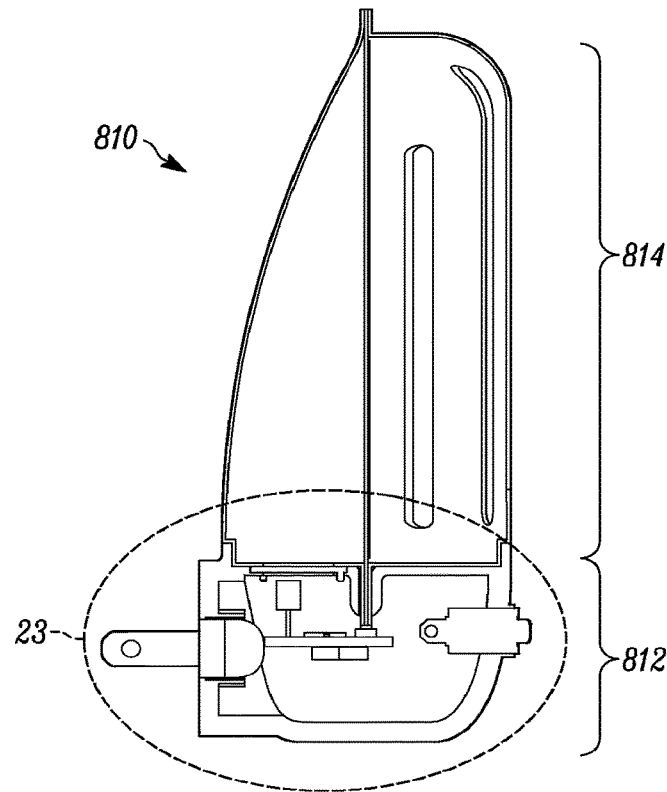
FIG. 22 is a cross sectional view of the insect trap of FIG. 21.
Figure 23:
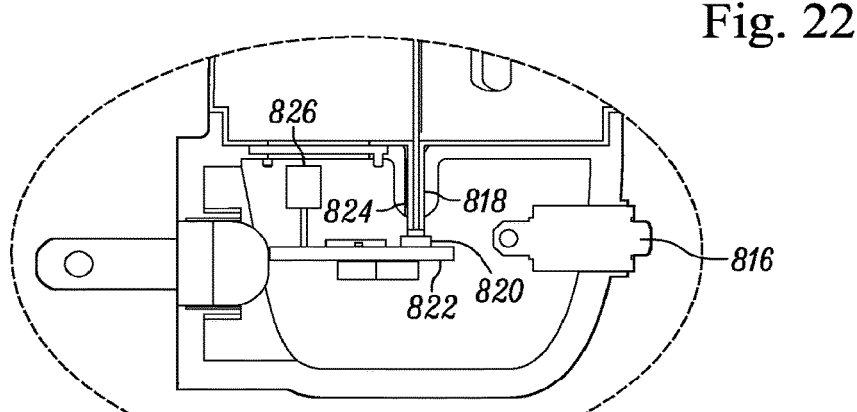
FIG. 23 is an enlarged view of a portion of FIG. 22.

FIG. 22 is a cross sectional view of insect trap 810 showing trap portion 814 mounted to base portion 812 and FIG. 23 is an enlarged view of a portion of FIG. 22. In some embodiments, base portion 812 includes a circuit board 822 having a programmable processor or chip (not shown) for executing commands, and configured to provide power and instructions to desired components (e.g., switch 816, LEDs 826, etc.). For clarity, however, not all of the electrical connections are shown. In some embodiments, circuit board 822 includes a docking or trap switch 820 mounted thereon. Tab 818 on trap portion 814 may protrude through corresponding opening 824 in base portion 812 and engage electrical trap switch 820 when trap portion 814 is mounted to base portion 812. Trap switch 820 may be configured to close when tab 818 on trap portion 814 engages with it and may be configured to open when the 818 is lifted from trap switch 820 (e.g., when trap portion 814 is removed from base portion 812). In some embodiments, trap switch 820 is configured to activate in response to pressure from tab 818 on trap portion 814. Alternatively, trap switch 820 may be configured to activate in response to displacement by tab 818 on trap portion 814. Alternatively, trap switch 820 may be configured as an optical switch to close when a light beam is broken by tab 818 of trap portion 814, or may be configured as a Hall effect sensor to close when in proximity to a magnet on trap portion 814, or may be configured as any other switch or sensor that opens or closes when trap portion 814 is mounted or removed from base portion 812.

Trap switch 820 is electrically connected to circuit board 822 and/or switch 816 to deactivate a lighting element such as UV and/or visible light LEDs 826 when trap portion 814 is removed from base portion 812, thereby preventing the user from looking directly at the UV and/or visible light from the LEDs 826. Alternatively, trap switch 820 may be electrically connected to circuit board 822 and/or switch 816 to deactivate only the UV LEDs 826 when trap portion 814 is removed from the portion 812.

In view of the many possible embodiments to which the principles of the present discussion may be applied, it should be recognized that the embodiments described herein with respect to the drawing figures are meant to be illustrative only and should not be taken as limiting the scope of the claims. For example, while angle measurements have been described as relative to the primary direction of light from the LEDs, for simplicity, the angles could also be relative to the vertical axis. In addition, for each of the embodiments, the front of the housing (or the entire housing or the entire trap portion) may be formed in a variety of decorative and/or functional shapes. For example, the housing may be shaped to resemble a flower or a plant, or a shell, or a company logo, or a sports team logo, or a football, or basketball, or soccer ball, or hockey puck, or a football helmet, or a hockey stick, or any other shape. Each of the example embodiments may include elements from other embodiments, even if not explicitly shown. Therefore, the techniques as described herein contemplate all such embodiments as may come within the scope of the following claims and equivalents thereof.

What is claimed is:

1. An insect trap comprising:
   a. a base portion comprising:
      i. two electrically conductive prongs protruding from a rear surface of the base portion, the two electrically conductive prongs adapted to mount the insect trap to a wall and provide power to the insect trap;
      ii. one or more LEDs, wherein the one or more LEDs emit blue light, UV light, or a combination thereof;
      iii. a transparent or translucent window located in a top surface of the base portion above the one or more LEDs;
      iv. a light-conducting body configured to receive light through a bottom surface thereof from the one or more LEDs, wherein the light from the one or more LEDs transmits through the transparent or translucent window in the base portion, passes through the bottom surface of the light-conducting body, enters the light-conducting body, and transmits through a portion of the light-conducting body; and
   b. a trap portion comprising:
      i. at least one surface having an adhesive coating;
      wherein at least a portion of the light transmitted through the light conducting body is directed to the adhesive coating when the trap portion is engaged with the base portion.

2. The insect trap of claim 1, wherein the light-conducting body is made from a transparent or translucent material.

3. The insect trap of claim 1, wherein the light-conducting body is free of an adhesive coating.

4. The insect trap of claim 1, wherein the at least a portion of the light directed to the adhesive coating is evenly distributed thereupon.

5. The insect trap of claim 1, wherein the adhesive coating comprises a pressure sensitive adhesive.

6. The insect trap of claim 5, wherein the pressure sensitive adhesive is selected from the group consisting of acrylics, butyl rubber, natural rubber, nitriles, silicones, styrene block copolymers, styrene-ethylene/propylene, styrene-isoprene-styrene, vinyl ethers, and mixtures thereof.

7. The insect trap of claim 1, wherein a thickness of the adhesive coating is about 0.05 mm to about 0.2 mm.

8. The insect trap of claim 7, wherein the thickness of the adhesive coating is about 0.1 mm.

9. The insect trap of claim 1, wherein the light-conducting body comprises facets.

10. The insect trap of claim 1, wherein the base portion is about 20 mm to about 130 mm wide, about 10 mm to about 50 mm high, and about 10 mm to about 80 mm deep.

11. The insect trap of claim 1, wherein the base portion comprises a top surface, wherein the top surface of the base portion has a slot configured to engage with the trap portion to secure the trap portion in place during use.

12. The insect trap of claim 1, wherein the trap portion is about 20 to about 130 mm wide, about 20 to about 130 mm high, and about 5 mm to about 80 mm deep.

13. The insect trap of claim 1, wherein the adhesive coating comprises a transparent or translucent adhesive.

14. The insect trap of claim 1, wherein the at least one surface is substantially planar.

15. The insect trap of claim 1, wherein the adhesive coating is configured to trap flying insects.

16. The insect trap of claim 1, wherein the light-conducting body is made from acrylic or polycarbonate plastic.

17. A method of using the insect trap of claim 11, the method comprising the steps of:
- a. providing the insect trap of claim 11;
- b. inserting the trap portion into the slot of the base portion;
- C. plugging the base portion into a household wall electrical socket;
- d. removing the trap portion from the base portion and discarding the trap portion without touching trapped insects or the adhesive coating, when a sufficient number of insects have been trapped; and
- e. replacing the discarded trap portion with a fresh trap portion.

* * * * *